United States Patent [19]

Imagawa et al.

[11] Patent Number: 4,864,558

[45] Date of Patent: Sep. 5, 1989

[54] SELF-ROUTING SWITCH

[75] Inventors: Hitoshi Imagawa, Kunitachi; Shigeo Urushidani, Tokorozawa; Koichi Hagishima, Kodaira, all of Japan

[73] Assignee: Nippon Telegraph and Telephone Corporation, Tokyo, Japan

[21] Appl. No.: 121,967

[22] Filed: Nov. 17, 1987

[30] Foreign Application Priority Data

| | | | |
|---|---|---|---|
| Nov. 29, 1986 | [JP] | Japan | 51-285621 |
| Mar. 13, 1987 | [JP] | Japan | 52-58440 |
| Jun. 1, 1987 | [JP] | Japan | 52-137933 |
| Jul. 30, 1987 | [JP] | Japan | 52-188983 |
| Jul. 30, 1987 | [JP] | Japan | 52-191198 |

[51] Int. Cl.⁴ ............ H04Q 11/04

[52] U.S. Cl. ............ 370/60

[58] Field of Search ............ 370/60, 58, 94, 88, 370/86

[56] References Cited

U.S. PATENT DOCUMENTS

| | | | |
|---|---|---|---|
| 4,661,947 | 4/1987 | Lea et al. | 370/60 |
| 4,736,465 | 4/1988 | Bobey et al. | 370/88 |
| 4,742,511 | 5/1988 | Johnson | 370/88 |

*Primary Examiner*—Benedict V. Safourek
*Assistant Examiner*—Wellington Chin
*Attorney, Agent, or Firm*—Pollock, VandeSande and Priddy

[57] ABSTRACT

In a self-routing switch which comprises a plurality of switching stages inserted between pluralities of input and output lines and cascade-connected by pluralities of input and output links, each switching stage includes a plurality of cascade-connected store/switch elements. Each store/switch element of each switching stage outputs an information data input thereto from the corresponding input link to the corresponding output link or shifts the input information data through a predetermined number of cascade-connected elements and outputs it to the corresponding output link, in accordance with a portion of routing information contained in the input information data, which portion corresponds to the switching stage.

37 Claims, 20 Drawing Sheets

SELF-ROUTING SWITCH

BACKGROUND OF THE INVENTION

The present invention relates to a self-routing switch which is based on distributed control by hardware, such as an interconnection network for interprocessor communications in a computer or a switch for fast packet switching.

FIG. 1 shows a Banyan switch known as a typical self-routing switch, which is shown to be a simple eight-by-eight switch for convenience of description. An information data which this switch handles is appended with a bit string ($a_1$, $a_2$, $a_3$) of routing information indicating the number of the output line to which the information data is to be transferred. In an ith stage (where $i=1, 2, 3$) switching takes place based on the bit $a_i$ of the routing information and the information data reaches the appointed output line after passage through all stages. For instance, a switch element 111-1 of the first stage transfers information data to a link 121-0 or 121-1 depending upon whether the bit $a_1$ of the routing information ($a_1$, $a_2$, $a_3$) of the information data, which is transferred from a link 120-0, is "0" or "1". A switch element 111-2 transfers information data to a link 121-2 or 121-3 depending upon whether the bit $a_1$ is "0" or "1". Also in the other switch elements of the first stage the same operation is performed according to the bit $a_1$. In second and third stages similar operations are repeated depending upon the bits $a_2$ and $a_3$ of the routing information ($a_1$, $a_2$, $a_3$) of the information data, respectively. As a result of this, the information data is transferred to the specified output line. Let it be assumed that the routing information of the information data transferred from an input line (100) through a link 120-4 is (0, 1, 0), for example. Since the bit $a_1$ is "0", a switch element 111-3 transfers the information date via a link 121-4 to a switch element 112-3; since the bit $a_2$ is "1", the switch element 112-3 transfers the information data via a link 122-5 to a switch element 113-2; and since the bit $a_3$ is a "0", the switch element 113-2 transfers the information data via a link 123-2 to the specified output line (010). This switch suffers from blocking because it provides only one routing path for each information data from one of the input lines to one of the output lines and a plurality of information data destined for different output lines may happen to pass through the same link. Accordingly, the switch becomes unable to perform routing operation in case of concentrated traffic. To avoid this, it is necessary to accelerate the link speed or increase the number of buffers in each switch element.

As a solution to this problem, there has been proposed a switch in which a sorting network 201 is provided at a stage preceding a routing network 204 as shown in FIG. 2 (A. Huang and S. Knauer, "STARLITE: A Wideband Digital Switch", AFIPS Conf. Proc' 84, 5, 3, 1–5.3.5). Reference numeral 202 indicates a comparator and 203 a trap circuit. The sorting network 201 checks the routing information appended to the information data and rearranges them in ascending or descending order of their output line numbers. The comparator 202 and the trap circuit 203 trap all information data having same routing information except for one of them to be transferred to the routing network 204 which may be of the type shown in FIG. 1. The information data thus trapped are applied again to the sorting network 201. In this way, the conventional switch prevents the occurrence of blocking.

With the prior art switch in which the sorting network 201 is provided at the stage preceding the routing network 204, however, letting the number of lines involved be represented by N, the scale of the routing network enlarges on the order of $(N/2)\log_2 N$ and the scale of the sorting network enlarges on the order of $(N/4)(\log_2 N)(\log_2 N+1)$; therefore, an enormous quantity of hardware will be needed when the number of lines N is large. Furthermore, many crossovers of links are involved, constituting an obstacle to fabrication of the switch as an LSI. In addition, the prior art switch has the defect that a delay time in switching undergoes substantial variations according to temporarily concentrated traffic on a certain output line.

SUMMARY OF THE INVENTION

It is therefore an object of the present invention to provide a self-routing switch which is small in the amount of hardware used, easy of control, and free from blocking.

The self-routing switch of the present invention comprises m (where $m \geqq 1$) cascade-connected switching stages. Each switching stage has at least n ($n \geqq 2$) input links and at least n output links, and the n output links are connected to at least n input links of the next switching stage. Furthermore, each switching stage has at least n store/switch elements, each of which is connected to the input and output links corresponding thereto. The n elements in the same switching stage are cascade-connected.

An information data, provided on one of the input links of the first switching stage from an input line, is transferred to a specified output line, passing through respective switching stages in accordance with the routing information appended to the information data. In the present invention the routing information is composed of k bits (where k is an integer which satisfies $2^{k-1} < n \leqq 2^k$, $k \geqq 1$) by which modulus n of the difference between the numbers of the input and output lines to be connected is represented in binary form. The switching stages are each assigned a different one of sub-bit strings $H_1, H_2, \ldots H_m$ obtained by dividing the k-bit routing information into m, starting at the most significant or least significant side thereof. In each switching stage an information data is shifted, in one direction, through the cascade-connected elements one after another and passed to the next switching stage, or is directly passed to the next switching stage without shift in accordance with the number corresponding to the assigned sub-bit string $H_i$ having its weight in the k-bit routing information. As a result of this, the information data is provided on the output link corresponding to the element to which the information data has finally reached in the switching stage.

In the self-routing switch of the present invention the routing information appended to each information data is determined based on the difference between the output and input line numbers and, in accordance with the difference, information data are provided at different element and/or at different time points on each switching stage. Accordingly, even if two or more information data have the same output line number, no blocking will occur in the switch. Moreover, such a self-routing switch can be implemented with a small amount of hardware.

DESCRIPTION OF THE PREFERRED EMBODIMENTS

Figure 1:
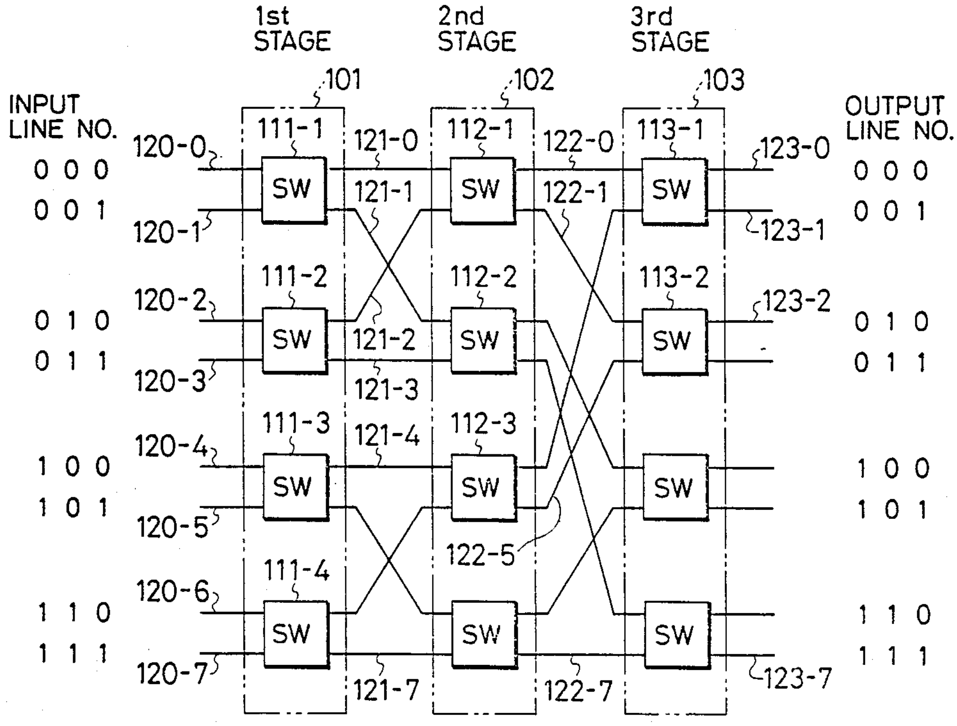
FIG. 1 is a block diagram showing a typical self-routing switch heretofore employed.
Figure 2:
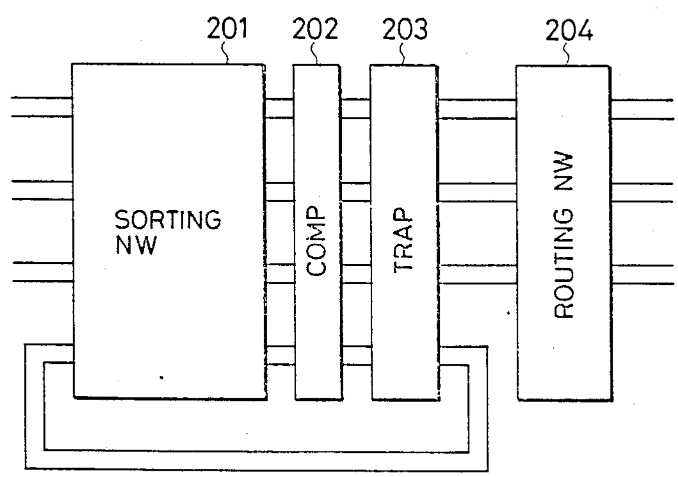
FIG. 2 is a block diagram showing an improved conventional self-routing switch.
Figure 3:
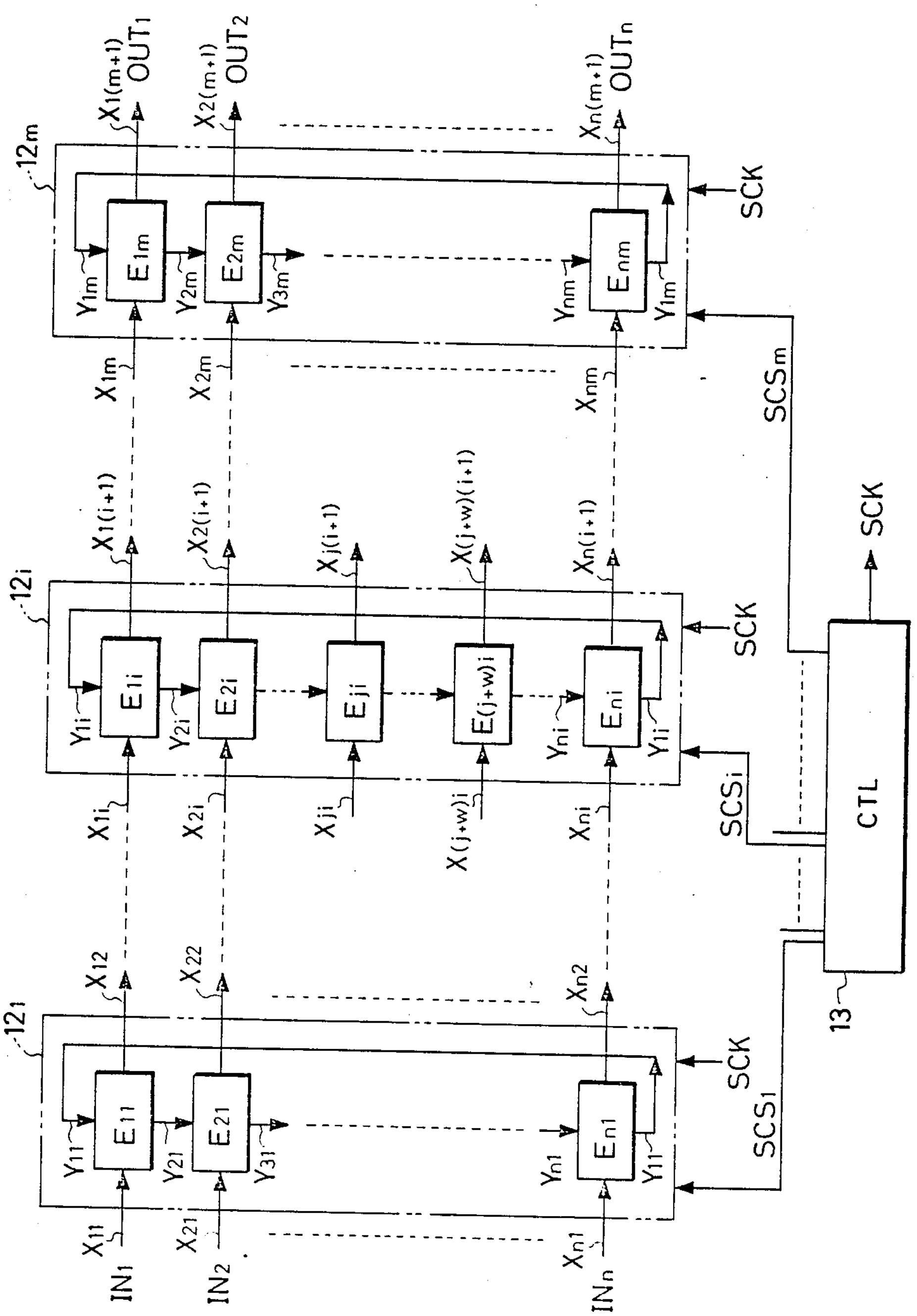
FIG. 3 is a block diagram illustrating an embodiment of the self-routing switch of the present invention.

FIG. 3 illustrates an example of the basic constitution of the switch according to the present invention. The numbers of input and output lines, n, are each $2^{k-1}<n\leqq 2^k$ and the number of switching stages is m, where $1\leqq m\leqq k$. An ith switching stage $12_i$ includes input links $X_{1i}$ to $X_{ni}$ and output links $X_{1(i+1)}$ to $X_{n(i+1)}$ connected to output links $X_{1i}$ through $X_{ni}$ of the preceding switching stage $12_{(i-1)}$ and input links $X_{1(i+1)}$ through $X_{n(i+1)}$ of the succeeding switching stage $12_{(i+1)}$, respectively. The m switching stages $12_1$ to $12_m$ are thus cascade-connected. The input links $X_{11}$ to $X_{n1}$ of the first switching stage $12_1$ are connected to input lines $IN_1$ through $IN_n$, respectively. The output links $X_{1(m+1)}$ through $X_{n(m+1)}$ of the final switching stage $12_m$ are connected to output lines $OUT_1$ through $OUT_n$, respectively. Information data are inputted into the switch from input lines $IN_1$ through $IN_n$ in synchronism with a system clock SCK, and in each of the m switching stages $12_1$ to $12_m$, each information data is output from a selected one of the output links at selected timing in accordance with the routing information H of the information data, whereby the information data will ultimately be transferred to their appointed ones of output lines $OUT_1$ through $OUT_n$, respectively.

In this embodiment each switching stage $12_i$ includes n store/switch elements $E_{1i}$ to $E_{ni}$ which are cyclically cascade-connected via internal links $Y_{1i}$ to $Y_{ni}$. These elements $E_{1i}$ to $E_{ni}$ are connected to the input links $X_{1i}$ through $X_{ni}$ and the output links $X_{1(i+1)}$ through $X_{n(i+1)}$ respectively corresponding to them. The elements $E_{1i}$ to $E_{ni}$ in each stage are each supplied with a shift control signal $SCS_i$ which is generated by a controller 13 in synchronism with the system clock SCK, and operate in accordance with the shift control signal $SCS_i$.

In the present invention the binary-coded k-bit routing information (which will hereinafter be referred to as the header) H is obtained by the following equation:

$$H=(0-I)\bmod n$$

where the symbol mod represents a modulus function and the $$H=\begin{cases} O-I \text{ for } O \geqq I \\ O-I+n \text{ for } O < I \end{cases}$$

above equation can be expressed by

In the above I is the number of the input line into which an information data is inputted, O is the number of the output line to which the information data is to be transferred, and n is the number of lines, which is chosen so that $2^{k-1}<n\leqq 2^k$, as mentioned previously. The k-bit header H added to the information data is divided into m sub-bit strings $H_1, H_2, \ldots H_m$, which are made to correspond to the m switching stages $12_1$ to $12_m$, respectively. An information data provided on an input link $X_{ji}$ on a jth row of an ith switching stage $12_i$ is applied to the store/switch element $E_{ji}$ of this stage. From the element $E_{ji}$ the information data is shifted, in one direction, through the succeeding cascade-connected elements by the number w equal to a weighted value of the sub-bit string $H_i$ corresponding to the switching stage, and as a result of this, the information data reaches and element $E_{(j+w)i}$ and is provided on an output link $X_{(j+w)(i+1)}$. It is a matter of course that when $H_i=0$ the information data applied to the element $E_{ji}$ is provided on an output link $X_{j(i+1)}$ of the same jth row. Information data are each inputted into the first switching stage from one of the input lines $IN_1$ through $IN_n$ every n system clocks and are shifted through the cascade-connected elements of each stage in synchronism with the system clock. In consequence, the information data thus applied to the self-routing switch of the present invention are subjected to change in output positions (to different output links) and/or output timings in each switching stage in accordance with the routing information or headers H of the information data. This permits blocking-free line connection.

Figure 4:
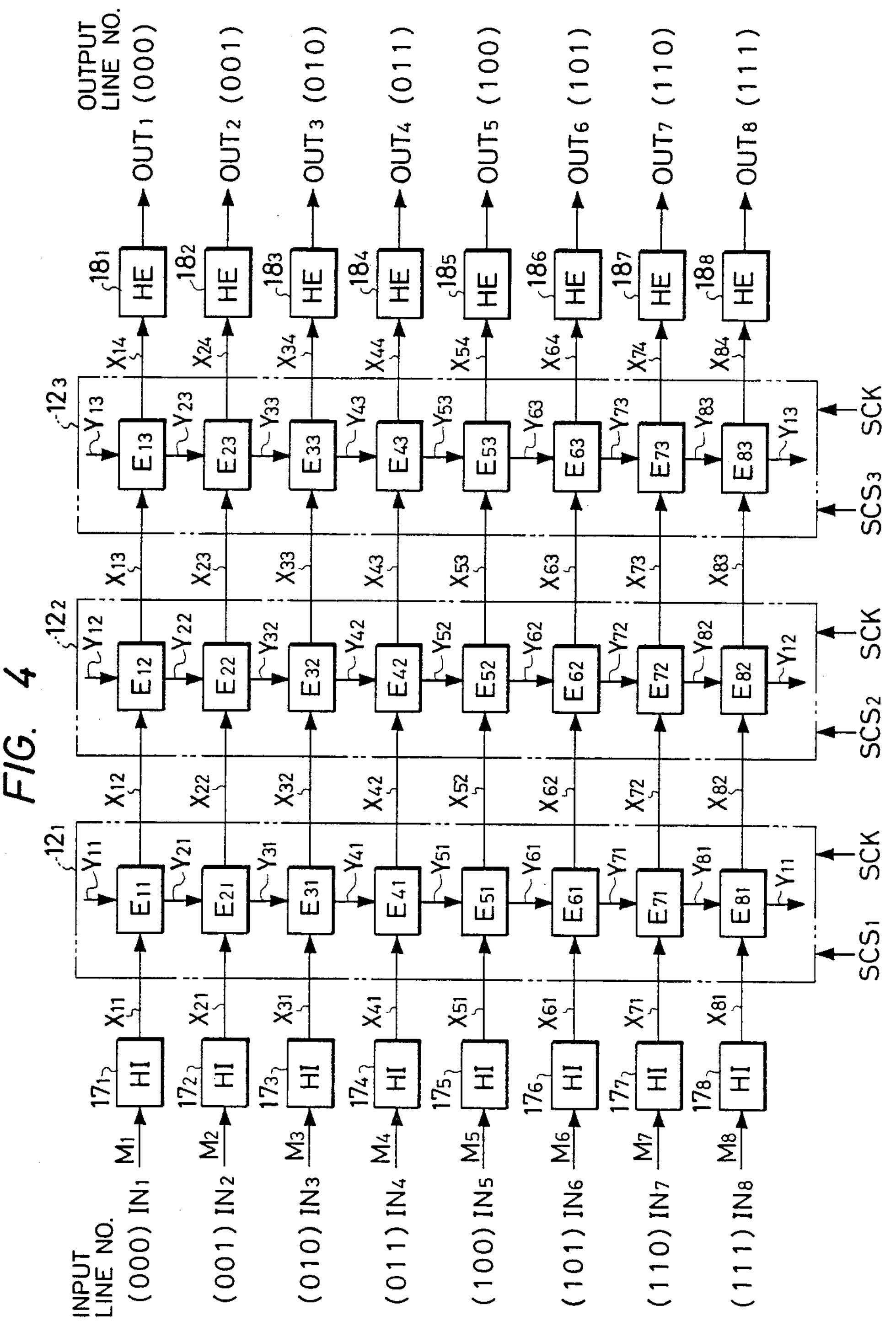
FIG. 4 is a block diagram illustrating another embodiment of the present invention which has eight input and output lines and three switching stages.

FIG. 4 shows an example of the embodiment of FIG. 3 in a simplified form in which n=8 and m=k=3, so as to facilitate a better understanding of the present invention. Accordingly, the header H is 3-bits long and header inserters $\mathbf{17}_1$ to $\mathbf{17}_8$ connected to the input lines $IN_1$ to $IN_8$ each insert the 3-bit header H ($h_1$, $h_2$, $h_3$) to the information data provided on the corresponding input line. Moreover, header eliminators $\mathbf{18}_1$ to $\mathbf{18}_8$ are connected to output links $X_{14}$ to $X_{84}$ of the final switching stage $\mathbf{12}_3$ and eliminate the headers H from information data before they are provided to the output lines $OUT_1$ to $OUT_8$. This example is identical in construction with the embodiment of FIG. 3 except in the above points. In the first switching stage $\mathbf{12}_1$, if the most significant bit $h_1$ of the header $H=(h_1, h_2, h_3)$ of an information data applied to one of the cyclically cascade-connected store/switch elements $E_{11}$ to $E_{81}$ is "0", then the information data is provided on the output link of the same row as that one of the store/switch elements. Where the bit $h_1$ is "1", then the information data is shifted, in synchronism with the system clock SCK, through the cascade-connected store/switch elements one after another by the number of times equal to the value of $h_1$ added with a weight $2^{3-1}$, that is, $1\times2^{3-1}=4$ times. In the second switching stage $\mathbf{12}_2$, the information data is similarly provided on the output link of the same row as the input link or shifted through the cascade-connected store/switch elements in synchronism with the system clock by $1\times2^{3-2}=2$ times, depending upon whether the second bit $h_2$ of the header H is "0" or "1". Also in the third switching stage $\mathbf{12}_3$, depending upon whether the third bit $h_3$ of the header H is "0" or "1", the information data is provided on the output link of the same row as the input link or shifted through the cascade-connected elements in synchronism with the system clock by $1\times2^{3-3}=1$ time, thereafter being provided on the output link corresponding to the store/switch element to which the information data has thus been shifted. The switching stages $\mathbf{12}_1$, $\mathbf{12}_2$ and $\mathbf{12}_3$ and the bits $h_1$, $h_2$ and $h_3$ can be made to correspond to each other in any desired combination as long as they have a one-to-one correspondence.

Now, consider the case where an information data supplied to the input line $IN_5$ (the input line number 100) is to be transferred to the output line $OUT_2$ (the output line number 001). The information data is applied to the header inserter $\mathbf{17}_5$, wherein it is appended with the header $H=(h_1, h_2, h_3)=(001-100)$ mod 1000=101 in binary expression, and the information data with the header H is transferred via the input link $X_{51}$ to the store/switch element $E_{51}$ of the first switching stage $\mathbf{12}_1$. Since the bit $h_1$ is "1", the information data is shifted from the element $E_{51}$ to the element $E_{11}$ via the element $E_{61}$, $E_{71}$ and $E_{81}$, using four system clocks SCK, and the information data is provided on the output link $X_{12}$ from the element $E_{11}$. The information data is then latched in the element $E_{12}$ of the second switching stage $\mathbf{12}_2$. Since the second bit $h_2$ of the header H corresponding to the second switching stage $\mathbf{12}_2$ is "0", the element $E_{12}$ provides the information data on the output link $X_{13}$ in the same row. The information data thus provided on the output link $X_{13}$ is latched in the element $E_{13}$ of the third switching stage $\mathbf{12}_3$. Since the third bit $h_2$ of the header H corresponding to the third switching stage $\mathbf{12}_3$ is "1", the information data is transferred to the element $E_{23}$ with one system clock SCK, from which it is applied via the output link $X_{24}$ to the header eliminator $\mathbf{18}_2$ for eliminating the header $H=(h_1, h_2, h_3)$ from the information data. Thus the information data is provided on the output line 001.

Figures 5A, 5B, 5C, 5D, 5E, 5F, 5G, 5H:
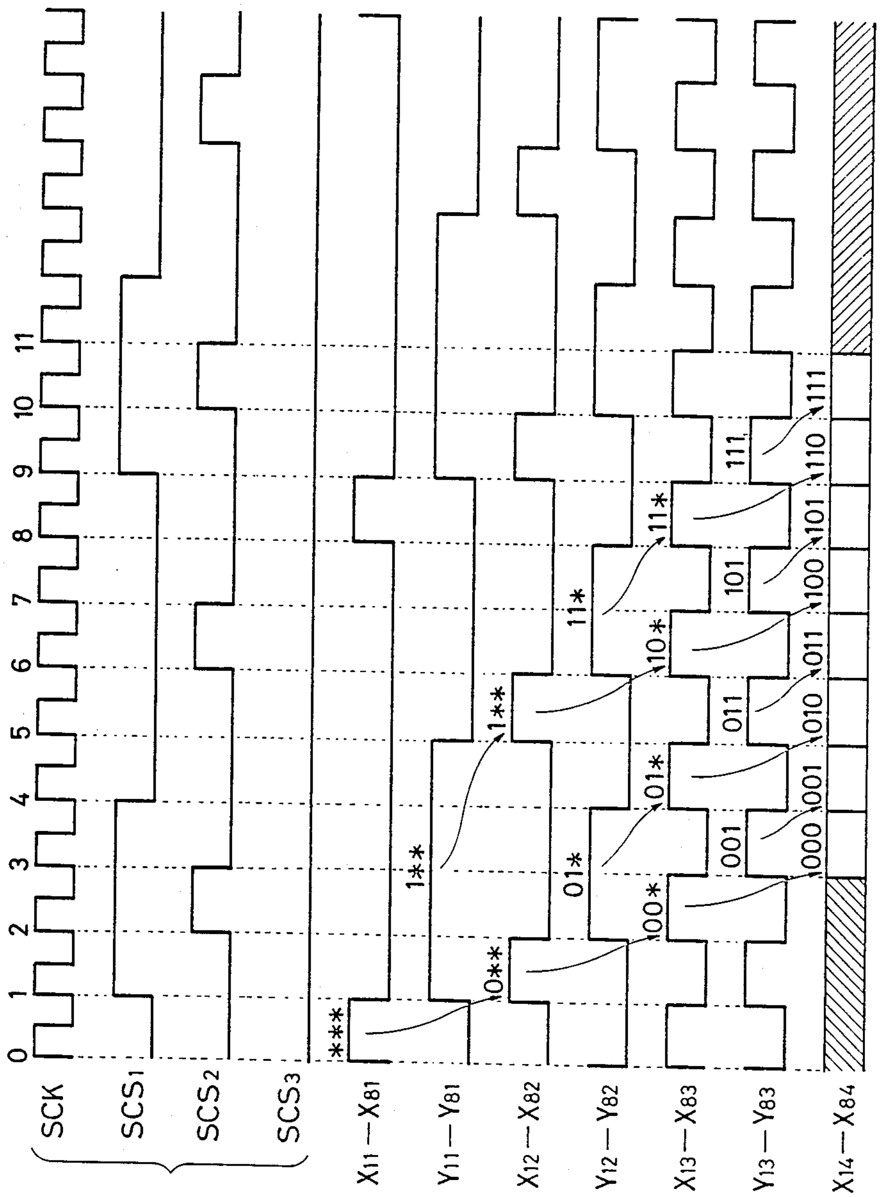
FIGS. 5A to 5H are timing charts showing the flow of information data in the switch depicted in FIG. 4.

FIGS. 5A through 5H are timing charts showing the flow of information data in the switch depicted in FIG. 4. The information data are each represented by the header bits $h_1$, $h_2$, $h_3$, and those of the bits $h_1$, $h_2$ and $h_3$ whose values are not specified may assume either of "0" and "1" and indicated by a symbol *. As will be seen from FIGS. 5A to 5H, information data (having arbitrary headers *****) are applied to the input links $X_{11}$ to $X_{81}$ (FIG. 5A) of the first switching stage $\mathbf{12}_1$ every n=8 system clocks SCK and are latched in the store/-switch elements $E_{11}$ to $E_{81}$ by the clock at that time, for example, by the clock SCK0 (FIG. 5B). Upon occurrence of the next clock SCK1, the information data with $h_1=1$, that is, the information data with the header 1**, are all shifted to the next elements (FIG. 5C), and at the same time, the information data with $h_1=0$, that is, the information data with the header 0**, are all provided on the output links $X_{12}$ to $X_{82}$ (FIG. 5D) and are latched in the elements $E_{12}$ to $E_{82}$ of the second switching stage $\mathbf{12}_2$. The information data with $h_1=1$ shifted by the system clock SCK1 in the first switching stage $\mathbf{12}_1$ are further shifted through the cascade-connected elements by clocks SCK2, SCK3 and SCK4 (FIG. 5C) and are provided on the output links $X_{12}$ to $X_{82}$ by the next clock SCK5 and then latched in the elements $E_{12}$ to $E_{82}$ of the second switching stage $\mathbf{12}_2$. Of the information data provided on the output links $X_{12}$ to $X_{82}$ and latched in the elements $E_{12}$ to $E_{82}$ by the clock SCK1, the information data with $h_2=1$, that is, those with the header H=01*, are shifted twice through the elements $E_{12}$ to $E_{82}$ by the clocks SCK2 and SCK3 (FIG. 5E). On the other hand, the information data with $h_2=0$, that is, those with the header H=00*, are not shifted but are provided on the output links $X_{13}$ to $X_{83}$ by the clock SCK2 (FIG. 5F) and latched in the elements $E_{13}$ to $E_{83}$ of the third switching stage $\mathbf{12}_3$. The twice-shifted information data with the header H=01* are provided on the output links $X_{13}$ to $X_{83}$ upon occurrence of the clock SCK4 (FIG. 5F) and are latched in the elements $E_{13}$ to $E_{83}$ of the third switching stage $\mathbf{12}_3$. Of the information data with the header H=1** provided on the output links $X_{12}$ to $X_{82}$ by the clock SCK5 (FIG. 5D) and latched in the elements $E_{12}$ to $E_{82}$ of the second switching stage $\mathbf{12}_2$, the information data with $h_2=1$, that is, the information data with the header H=11*, are shifted twice through the elements by clocks SCK6 and SCK7 (FIG. 5D), and the information data with $h_2=0$, that is, the information data with the header H=10*, are provided on the output links $X_{13}$ to $X_{83}$ by the clock SCK6 (FIG. 5F) and are latched in the elements $E_{13}$ to $E_{83}$ of the third switching stage $12_3$. The information data with the header H=11*, shifted by the clocks SCK6 and SCK7 (FIG. 5E), are provided on the output links $X_{13}$ to $X_{83}$ by a clock SCK8 and they are latched in the elements $E_{13}$ to $E_{83}$ of the third switching stage $12_3$. Of the information data latched in the elements $E_{13}$ to $E_{83}$ of the third stage $12_3$ by the clocks SCK2, SCK4, SCK6 and SCK8, the information data with $h_3=1$, that is, those whose headers are 001, 011, 101 and 111, are shifted once by the clocks SCK3, SCK5, SCK7 and SCK9 (FIG. 5G), respectively, and are provided on the output links $X_{14}$ to $X_{84}$ by the clocks SCK4, SCK6, SCK8 and SCK10, respectively (FIG. 5H). On the other hand, the information data with $h_3=0$, that is, those whose headers are 000, 010, 100 and 110, are not shifted but are provided on the output links $X_{14}$ to $X_{84}$ by the clocks SCK3, SCK5, SCK7 and SCK9, respectively (FIG. 5H**).

As will be appreciated from the above, a shift control signal $SCS_1$ of a 3-clock duration is used in the first switching stage $12_1$ for repeating the shift operation for four consecutive system clocks beginning with the clock for entering the information data into the elements $E_{11}$ to $E_{81}$; a shift control signal $SCS_2$ of a 1-clock duration is used in the second switching stage $12_2$ for repeating the shift operation for two consecutive system clocks starting with the clock for the information data entering operation; and a shift control signal $SCS_3$ which always remains "0" is used in the third switching stage $12_3$ in which the shift operation is performed at the clocks for information data entering operation. The durations of the shift control signals $SCS_1$, $SCS_2$ and $SCS_3$ are shorter, by one clock, than the shift clock numbers 4, 2 and 1 of the information data in the first, second and third switching stages 121, $12_2$ and $12_3$, respectively. The reason for this is that one shift operation is automatically carried out by entering of the information data into each element one clock before the occurrence of each shift control signal.

In the self-routing switch shown in FIG. 4, as is evident from the timing charts depicted in FIG. 5, the information data from any desired one of the input lines $IN_1$ to $IN_8$ can be transferred to any desired one of the output lines $OUT_1$ to $OUT_8$. In addition, no blocking will occur in the switch, because the self-routing switch of the present invention shifts the position of each information data spatially and/or temporarily in accordance with the routing information contained therein. Let it be assumed that information data $M_1$ to $M_8$ entered from the input lines $IN_1$ to $IN_8$ at the clock SCK0 all have the same header H=(000). This means that all the information data entered from the input lines $IN_1$ to $IN_8$ are to be transferred to the output lines $OUT_1$ to $OUT_8$ of the same line numbers as those of the input lines, respectively. In this instance, all the information data $M_1$ to $M_8$ concurrently entered at the clock SCK0 from the input lines $IN_1$ to $IN_8$ will be simultaneously provided on the different output lines $OUT_1$ to $OUT_8$ at the clock SCK3. For another example, assuming that the information data $M_1$ to $M_8$ entered at the clock SCK0 from the input lines $IN_1$ to $IN_8$ have headers (000), (111), (110), (101), (100), (011), (010) and (001), respectively, so that all of them are to be transferred to the same output line $OUT_1$ of the line number (000), the information data will be provided on the output line $OUT_1$ in the order of $M_1$, $M_8$, $M_7$, $M_6$, $M_5$, $M_4$, $M_3$ and $M_2$ at the clocks SCK3 to SCK10, respectively. In other words, the information data on all the input lines $IN_1$ to $IN_8$ are multiplexed on the time base and provided on one output line. According to the self-routing switch of the present invention, information data from a desired number of n input lines can easily be provided on a given output line on a time-division multiplexed basis.

Figure 6:
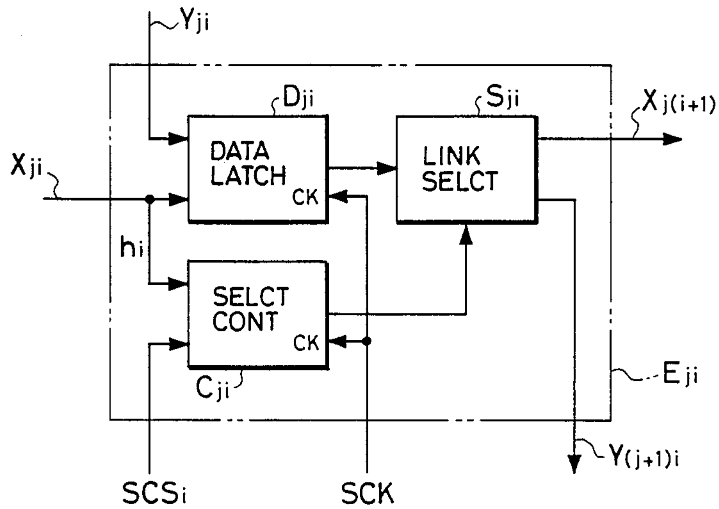
FIG. 6 is a block diagram illustrating the constitution of a store/switch element in FIG. 4.

FIG. 6 illustrates in block form an example of the store/switch element $E_{ji}$ which is used on the jth row in the ith switching stage of the switch shown in FIG. 4. The element $E_{ji}$ is composed of a data latch $D_{ji}$, a link selector $S_{ji}$ and a selector controller $C_{ji}$. When applied to the element $E_{ji}$ from the output link $X_{ji}$ of the preceding stage, an information data is latched in the data latch $D_{ji}$ at the timing synchronized with the system clock SCK, and at the same time, the ith bit $h_i$ of the header H contained in the information data is latched in the selector controller $C_{ji}$. Where the header bit $h_i$ latched in the selector controller $C_{ji}$ is "0", the selector controller $C_{ji}$ controls the link selector $S_{ji}$ so that the information data latched in the data latch $D_{ji}$ is sent to the output link $X_{j(i+1)}$, over which it is transferred to the element $E_{j(i+1)}$ of the next switching stage. Where the bit $h_i$ is "1", the input of the link selector $S_{ji}$ is connected to the lower internal link $Y_{(j+1)i}$, over which the information data latched in the data latch $D_{ji}$ is transferred to the element $E_{(j+1)i}$ in the next row cascade-connected to the element $E_{ji}$. On the other hand, an information data transferred to the element $E_{ji}$ from the element $E_{(j-1)i}$ of the preceding row via the upper internal link $Y_{ji}$ is latched in the data latch $D_{ji}$ in synchronism with the system clock SCK. At the same time, the shift control signal $SCS_i$ is latched in the selector controller $C_{ji}$. Accordingly, as is the case with the header bit $h_i$, the connection of the link selector $S_{ji}$ is controlled depending on whether the shift control signal $SCS_i$ is "0" or "1", and the information data latched in the data latch $D_{ji}$ is provided on the output link $X_{(j+1)i}$ or the lower internal link $Y_{(j+1)i}$.

Figure 7:
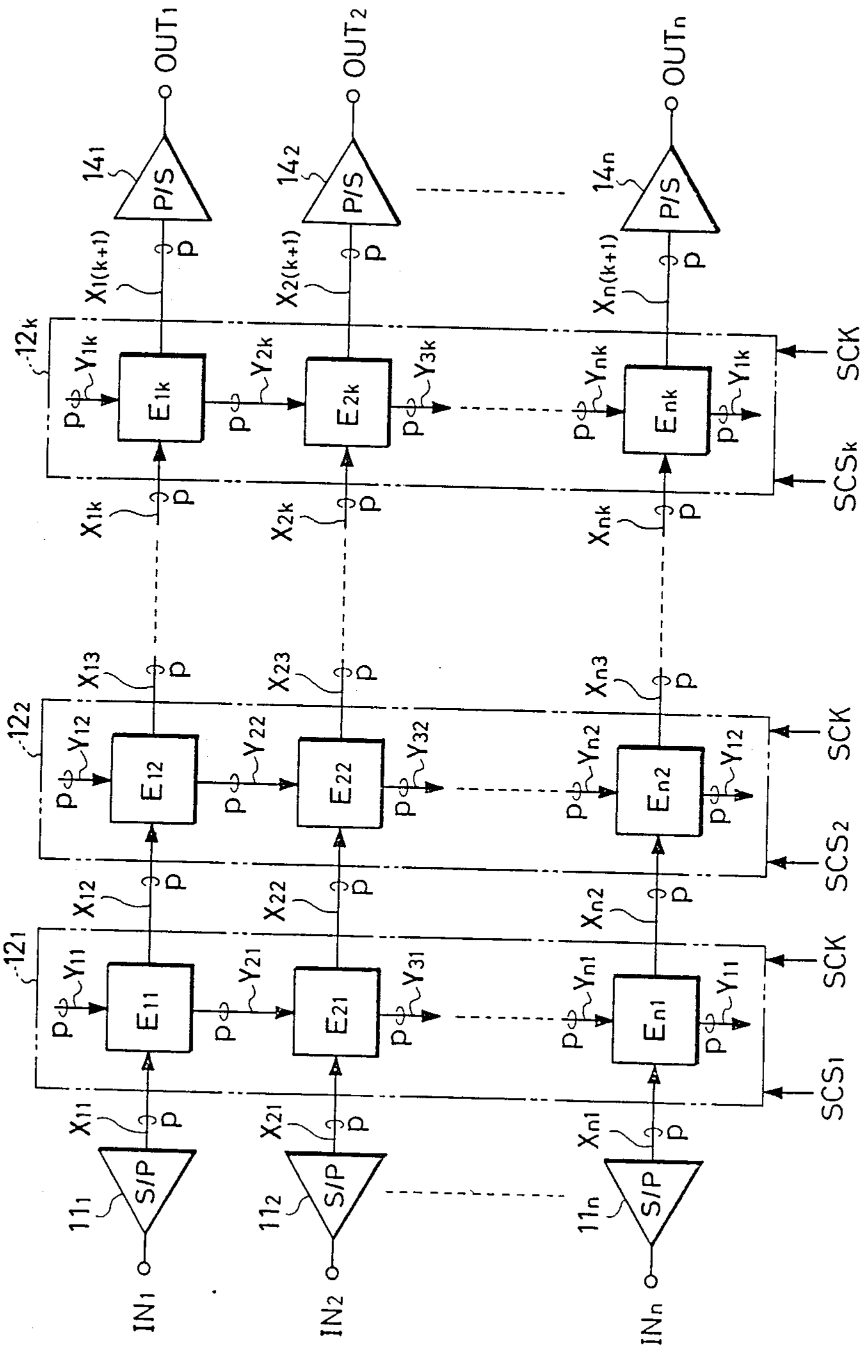
FIG. 7 is a block diagram illustrating an embodiment which effects parallel bits routing control of the switch of the present invention.

To afford a better understanding of the basic concept of the present invention, the structure of the switch has been described above ignoring the fact that the information data M containing the k-bit header H is naturally two or more bits in length. In practice, however, it is necessary to control, in accordance with the header H, the routing in each switching stage for the information data composed of a plurality of bits, say, 8 bits including 3-bit header H. To meet this requirement, when each input/output line is a serial interface line, the switch is so arranged as to perform a serial-parallel conversion of the information data from each input line for each p-digit word, for instance, and each switching stage is so adapted as to perform parallel processing for routing the information data a word of parallel p bits at a time. FIG. 7 shows an example of this arrangement.

In the self-routing switch shown in FIG. 7 the number of input/output lines is n (where $n=2^k$) and k switching stages $12_1$ to $12_k$ are cascade-connected. The input lines $IN_1$ to $IN_n$ have p-bit serial-parallel converters $11_1$ to $11_n$ connected thereto, respectively, and their p-bit parallel outputs are connected to parallel p-bit input links $X_{11}$ through $X_{n1}$. The input and output links $X_{ji}$ and $X_{j(i+1)}$ of each switching stage $12_i$ are parallel p-bits lines, and internal links $Y_{1i}$ to $Y_{ni}$ for the cyclical cascade-connection of the store/switch elements $E_{1i}$ to $E_{ni}$ in each switching stage $12_i$ are also parallel p-bit lines. The parallel p-bit output links $X_{1(k+1)}$ to $X_{n(k+1)}$ of the final switching stage $12_k$ are connected to p-bit parallel-serial converters $14_1$ to $14_n$, respectively, the outputs of which are connected to the output lines $OUT_1$ to $OUT_n$, respectively.

Information data, each containing a header, are applied to the serial-parallel converters $11_1$ to $11_n$ from the input lines $IN_1$ to $IN_n$. The serial-parallel converters $11_1$ to $11_n$ each convert the input information data from serial to parallel form for each p-digit word including the k-bit header H and provide it on the parallel p-bit input link $X_{ji}$. In this case, when $p<n$, a parallel p-bit information data is applied to each row j of the first switching stage every n clocks. The element $E_{ji}$ of each stage performs parallel processing for the routing of the input parallel p-bit information data, in synchronism with the system clock. Accordingly, the timing charts of operation for the information data in this k-stage self-routing switch are basically the same as those depicted in FIGS. 5A through 5H. In particular, when $n=p=8$ and $k=3$ in FIG. 7, then the timing charts will be exactly the same as those shown in FIGS. 5A to 5H, although the information data which is handled in each element at each system clock is a parallel 8-bit one. In general, when $p<n$, it is necessary to adjust the input timing to apply the information data from the input lines $IN_1$ to $IN_n$ to the serial-parallel converters $11_1$ to $11_n$ so that a predetermined time interval is placed after every consecutive p bits and the serial-parallel converters $11_1$ to $11_n$ output therefrom the information data every n clocks. In the case where $\leqq$p, however, it is possible to input the information data successively from the input lines $IN_1$ to $IN_n$ into the serial-parallel converters $11_1$ to $11_n$ in synchronism with the clock without the necessity of adjusting the input timing and to output from the serial-parallel converters $11_1$ to $11_n$ the information data by p bits in parallel at every pth clock.

In the embodiment of the p-bit parallel processing shown in FIG. 7 each store/switch element $E_{ji}$ must also perform the p-bit parallel operation. To perform this, it is necessary that each of the links $X_{ji}$, $X_{j(i+1)}$, $Y_{ji}$ and $Y_{(j+1)i}$ shown in FIG. 6 be of parallel p-bit line and that the data latch $D_{ji}$ and the link selector $S_{ji}$ also be provided by p, respectively. In this instance, however, a single selector controller $C_{ji}$ can be used in common to the p data latches $D_{ji}$ and the p link selectors $S_{ji}$. A specific operative example of this arrangement is shown in FIG. 8.

Figure 8:
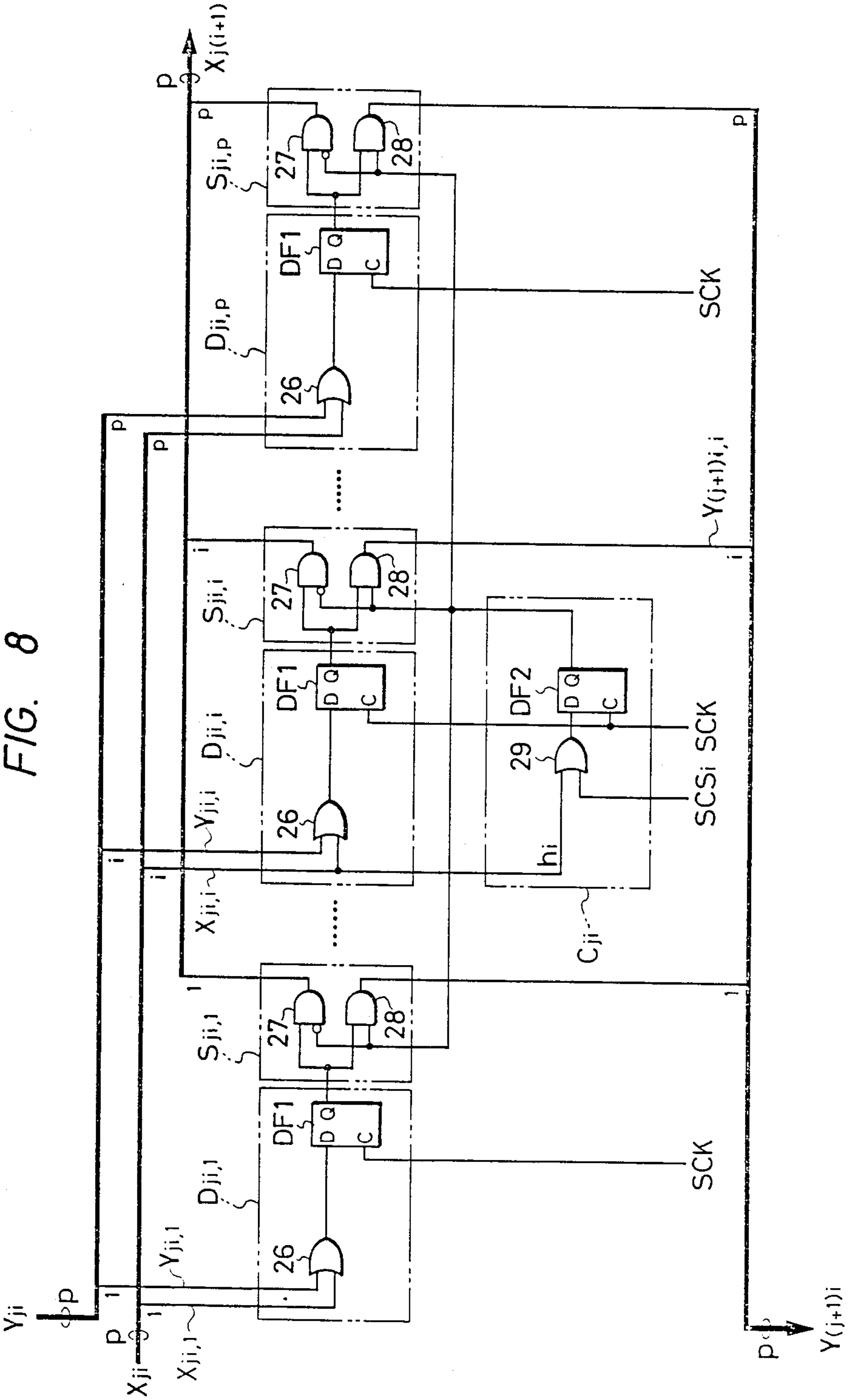
FIG. 8 is a circuit diagram showing the constitution of an element $E_{ji}$ in FIG. 7.

FIG. 8 illustrates the arrangement of the element $E_{ji}$ of the jth row in the ith switching stage $12_i$. The p data latches $D_{ji,1}$ to $D_{ji,p}$ are connected to corresponding bit lines of the parallel p-bit input link $X_{ji}$ and the parallel p-bit internal link $Y_{ji}$. The p link selectors $S_{ji,1}$ to $S_{ji,p}$ are also connected to corresponding bit lines of the output link $X_{j(i+1)}$ and the internal link $Y_{(j+1)i}$ both of which are parallel p-bit. On the assumption that the ith bit $h_i$ of the header H for controlling the routing in the ith switching stage $12_i$, to which the element $E_{ji}$ belongs, is the ith bit of the p-bit information data, the single selector controller $C_{ji}$ has its input connected to the ith bit line $X_{ji,i}$ of the input link $X_{ji}$ and its output connected to all of the p link selectors $S_{ji,1}$ through $S_{ji,p}$.

Each data latch $D_{ji,i}$ has an OR gate 26 connected to the ith bit lines of the input link $X_{ji}$ and the internal link $Y_{ji}$ and a D flip-flop DF1 having its data terminal connected to the output of the OR gate 26. The flip-flop DF1 latches data which is applied thereto at each system clock SCK. Each link selector $S_{ji,i}$ has two AND gates 27 and 28 whose two inputs are connected in parallel to each other. Each of the AND gates 27 and 28 is connected at one input to a Q output of the flip-flop DF1 of the data latch $D_{ji,i}$ and at the other input to the output of the selector controller $C_{ji}$. The selector controller $C_{ji}$ comprises an OR gate 29 connected to the ith bit line $X_{ji,i}$ of the input link $X_{ji}$ and a D flip-flop DF2 having its data input terminal connected to the output of the OR gate 29. From the ith bit line $X_{ji,i}$ of the parallel p-bit input link $X_{ji}$ the ith bit $h_i$ of the header H is applied via the OR gate 29 to the data terminal of the D flip-flop DF2, and when the ith bit $h_i$ is latched therein by the system clock SDK, its Q output is provided to the gates 27 and 28 of the link selectors $S_{ji,1}$ to $S_{ji,p}$. If the ith bit $h_i$ is "0", that is, if the Q output of the flip-flop DF2 is "0", all of the AND gates 27 are opened, through which the p-bit information data latched in the p flip-flops DF1 of the data latches $D_{ji,1}$ to $D_{ji,p}$ is simultaneously provided on the parallel p-bit output link $X_{j(i+1)}$. When the ith bit $h_i$ is "1", that is, when the Q output of the flip-flop DF2 is "1", all of the AND gates 28 are opened, through which the p-bit information data latched in the p flip-flips DF1 of the data latches $D_{ji,1}$ to $D_{ji,p}$ are simultaneously provided on the parallel p-bit internal link $Y_{(j+1)i}$ and are applied to the element $E_{(j+1)i}$ of a (j+1)th row. The OR gate 29 is supplied with a cyclic shift control signal $SCS_i$ which remains at "1" while the elements $E_{1i}$ to $E_{ni}$ in the same ith switching stage $12_i$ perform the cyclic shift operation continuously by $(2^{i-1})$ system clocks. When the control signal $SCS_i$ is "1", the Q output of the flip-flop DF2 is also "1", and accordingly all of the AND gates 28 remain open during the duration of the $(2^{i-1})$ system clocks including one for latching the header bit $h_i$ of "1". In this while, upon each application of the system clock SCK to the flip-flops DF1 of the data latches $D_{ji,1}$ to $D_{ji,p}$ the information data shifted from the upper internal link $Y_{ji}$ is latched in the p flip-flops DF1 and output on the lower internal link $Y_{(j+1)i}$ via the p AND gates 28.

While the example of FIG. 8 has been described in connection with the case where the input information data are each subjected to the p-bit serial-parallel conversion and each element in the self-routing switch performs the p-bit parallel routing operation, it is also possible to perform the routing of the information data in a serial form, without involving the serial-parallel conversion. In such a case, it is sufficient only to provide a p-bit shift register in the data latch $D_{ji}$ of each store/switch element $E_{ji}$ shown in FIG. 6 and drive the shift register with another clock p times faster than the system clock SCK.

Figure 9:
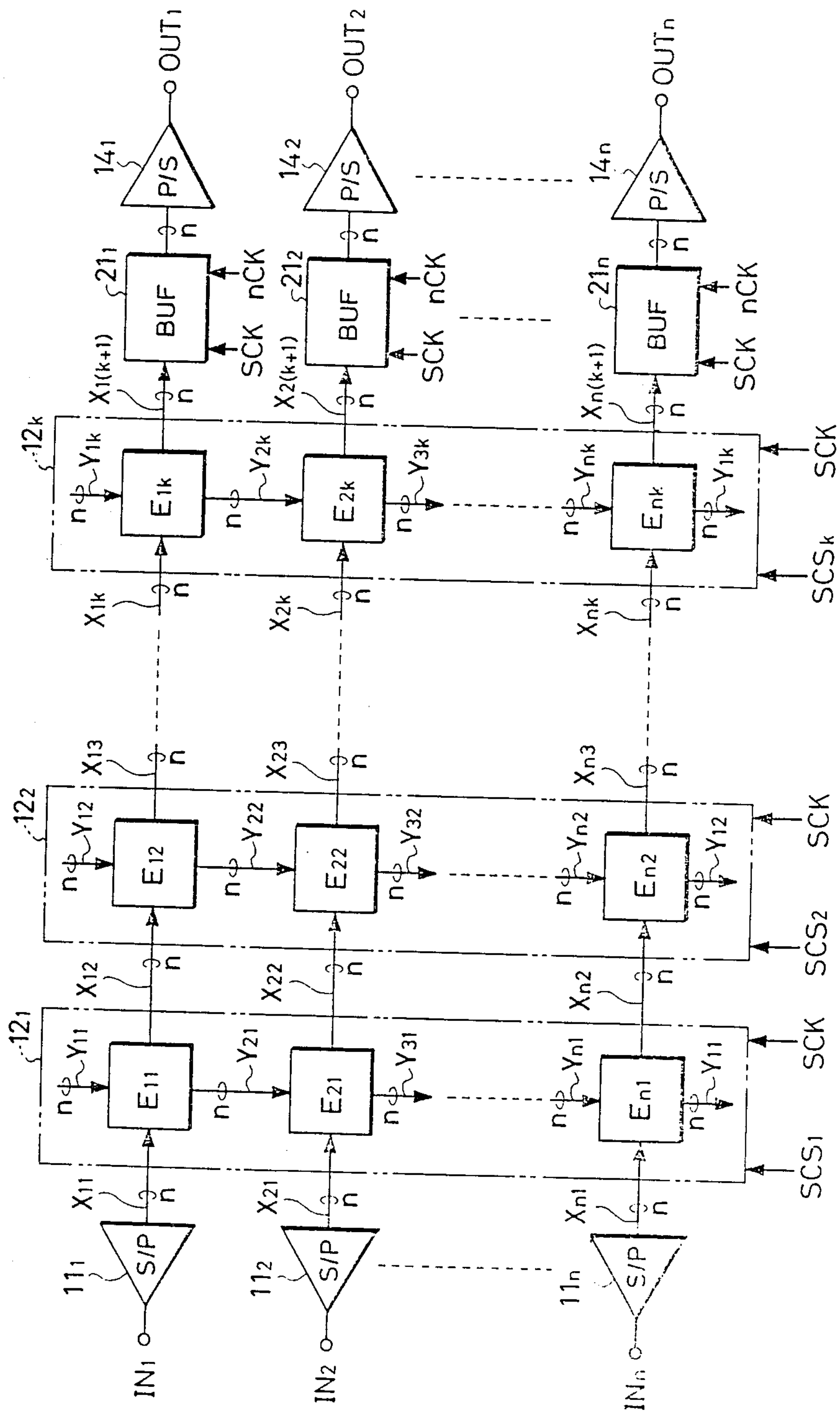
FIG. 9 is a block diagram illustrating another embodiment of the present invention in which a buffer is connected to each output link of a final switching stage.

As will be understood from the description given of the timing charts depicted in FIGS. 5A through 5H, it is during consecutive n system clocks SCK that the information data $M_1$ to $M_n$ concurrently input into the input lines $IN_1$ to $IN_n$ (see FIG. 4) are each routed onto any one of the output lines $OUT_1$ to $OUT_n$. Furthermore, the routing information (modulus n of the differences between the numbers of the input and output lines to be connected) and the output timing during the above-said consecutive n system clocks have a fixed one-to-one correspondence with each other, as depicted in FIG. 5H. Accordingly, if the input lines $IN_1$ to $IN_n$ and the output lines $OUT_1$ to $OUT_n$ are connected in a one-to-one relationship, then the information data will be provided on the output lines $OUT_1$ to $OUT_n$ at different clock positions in the afore-mentioned consecutive n clocks, and for successive application of information data at every n clocks to each of the input lines $IN_1$ to $IN_n$, the information data will appear at every nth clocks on the designated one of the output lines $OUT_1$ to $OUT_n$. Where some of the input lines $IN_1$ to $IN_n$ are temporarily connected to the same output line, information data are provided on the output line at a plurality of different clock positions within the consecutive n clocks. In addition, these clock positions change in accordance with the contents of the headers H. Usually, it is not preferable to transfer information data to the output lines $OUT_1$ to $OUT_n$ with their output timings varying among the output lines or with their output intervals varying with the time. FIG. 9 shows an embodiment of the present invention for solving this problem.

The embodiment of FIG. 9 is identical in construction with the embodiment of FIG. 7 except that the switching stages $\mathbf{12}_1$ to $\mathbf{12}_k$ are each adapted for the n-bit parallel processing. In this embodiment buffer circuits $\mathbf{21}_1$ to $\mathbf{21}_n$ are connected to the output links $X_{1(k+1)}$ to $X_{n(k+1)}$ of the final kth switching stage $\mathbf{12}_k$. These buffer circuits $\mathbf{21}_1$ to $\mathbf{21}_n$ adjust the flow of parallel n-bit information data such that these information data received from the output links $X_{1(k+1)}$ to $X_{n(k+1)}$ in synchronism with the system clock SCK are temporarily stored and then output to the parallel-serial converters $\mathbf{14}_1$ to $\mathbf{14}_n$ in synchronism with a clock nCK which occurs every n system clocks SCK. Accordingly, the parallel-serial converters $\mathbf{14}_1$ to $\mathbf{14}_n$ need only to receive the input information data every n system clocks, so that their operation timing can easily be controlled.

Figure 10:
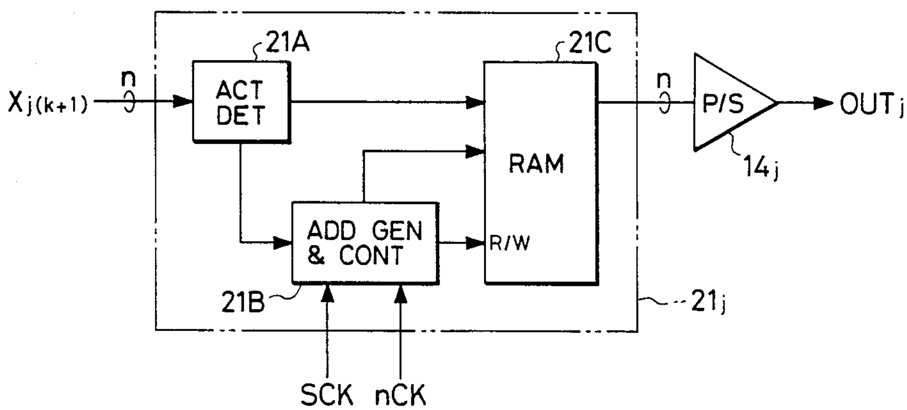
FIG. 10 is a block diagram illustrating an example of the constitution of each buffer $21_j$ in FIG. 9.

FIG. 10 illustrates an example of the construction of one buffer circuit $\mathbf{21}_j$ for use in the embodiment of FIG. 9. A predetermined bit position in each n-bit information data is assigned to an active channel bit indicating the presence of information data, and when the active channel bit is "1", it represents the presence of the information data. The buffer $\mathbf{21}_j$ comprises an active channel detector 21A, an address generator/controller 21B, and a random access memory 21C. The parallel n-bit input link $X_{j(k+1)}$ is connected to the active channel detector 21A, by which it is detected whether "1" is present or not in a predetermined bit line corresponding to the active channel bit. Each time the active channel detector 21A detects "1", the address generator/controller 21B generates a write-in address and it also generates a readout address in synchronism with the clock nCK at time intervals of n system clocks SCK and generates a read/write instruction signal together with such addresses. In this instance, however, a write address and the readout address are phased half a cycle apart. The RAM 21C responds to the write instruction to write at the given addresses the parallel n-bit information data input via the active channel detector 21A, and reads out written information data in a predetermined order every n system clocks. Accordingly, the thus read-out information data are supplied to the parallel-series converter $\mathbf{14}_j$ every n system clocks. With such an arrangement, when clock positions between consecutive information data sent from the same input line to the buffer $\mathbf{21}_j$ every n system clocks are occupied by information data from other input lines, that is, when the intervals between adjacent information data become shorter than the n-clock length owing to temporary concentration of traffic on one output line, information data can always be output from the buffer $\mathbf{21}_j$ every n system clocks. An increase in the amount of traffic concentrated on a particular output line and an increase in the time length of concentrated traffic can be dealt with simply by increasing the capacity of the RAM 21C.

In each of the afore-mentioned embodiments of the self-routing switch the information data $M_j$ input into each input line $IN_j$ is transferred to one of the output lines, that is, the so-called one-to-one connection is carried out. These embodiments can also be equipped with a function of performing a broadcast connection (a one-to-N connection) by which each input line is connected to all the output lines, as required. To implement such a function, a broadcast connection (BC) bit is additionally provided, as part of the routing information of each information data, at a predetermined bit position. Depending upon whether the BC bit is "1" or not, each store/switch element of each switching stage decides whether to effect the broadcast connection or not. When the BC bit is "1", the broadcast connection takes place without regard to the other k-bit header H. In order to implement a self-routing switch capable of the broadcast connection in, for example, the embodiment of FIG. 7, each store/switch element $E_{ji}$ is constructed as depicted in FIG. 11.

Figure 11:
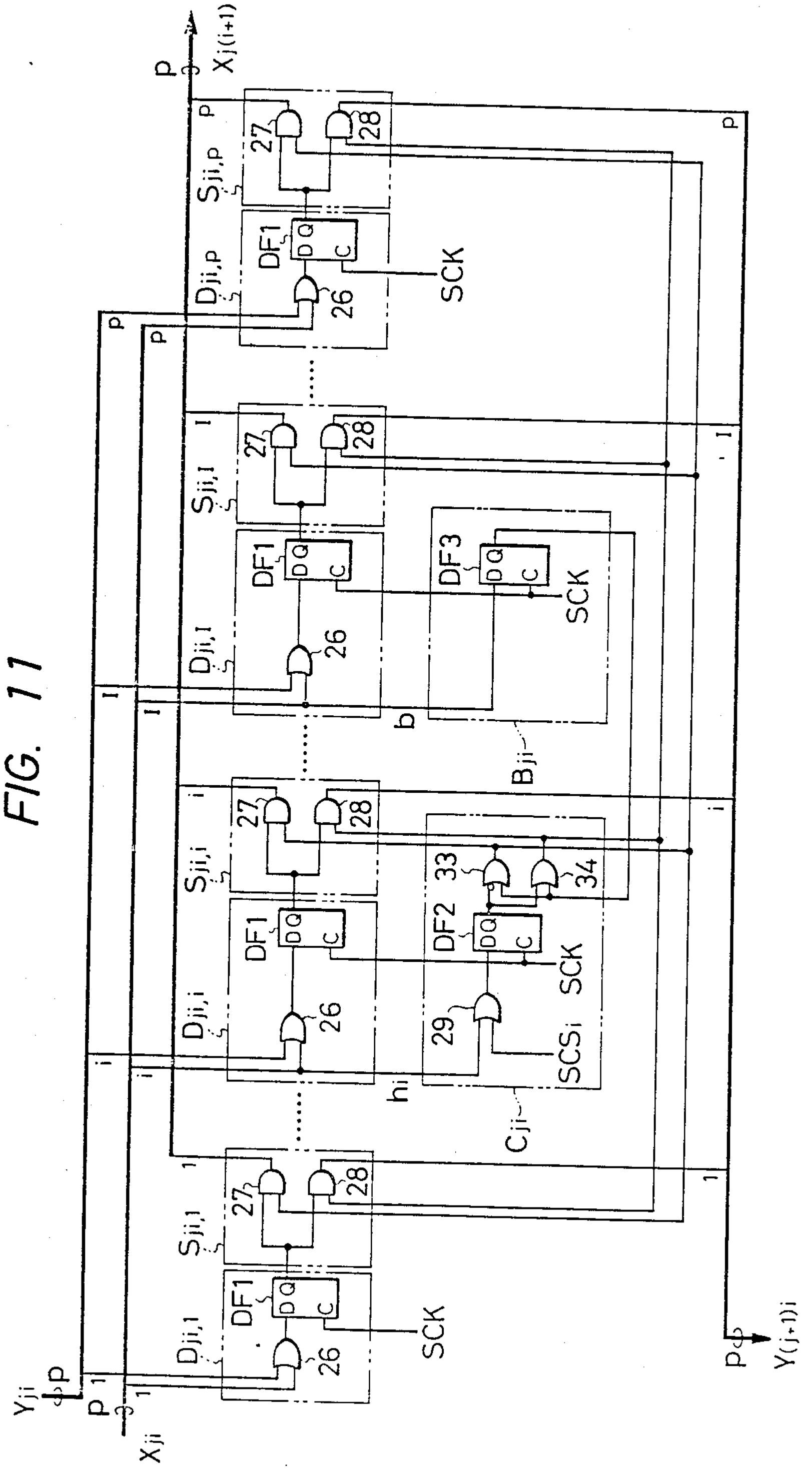
FIG. 11 is a circuit diagram showing the constitution of each element $E_{ji}$ in the case where the self-routing switch of FIG. 7 is additionally equipped with a broadcast connection function.

In the element $E_{ji}$ capable of the broadcast connection shown in FIG. 11, as is the case with the element depicted in FIG. 8, the data latches $D_{ji,1}$ to $D_{ji,p}$ and the link selectors $S_{ji,1}$ to $S_{ji,p}$ are connected to the parallel p-bit lines of each of the links $X_{ji}$ and $Y_{ji}$, and the common selector controller $C_{ji}$ for controlling the link selectors $S_{ji,1}$ to $S_{ji,p}$ is connected to the ith bit line of the link $X_{ji}$. The element $E_{ji}$ depicted if FIG. 11 differs from the element $E_{ji}$ of FIG. 8 in that a broadcast connection controller (hereinafter referred to as the BC controller) $B_{ji}$ is provided which is connected to an Ith bit line of the link $X_{ji}$ and in that the output of the selector controller $C_{ji}$ is controlled by the output of the BC controller $B_{ji}$. The BC controller $B_{ji}$ is formed by a D flip-flop DF3 connected to the Ith bit line, and it receives a value b of the BC bit from the Ith bit line and latches it in the flip-flop DF3. Two OR gates 33 and 34 are connected to the output of the flip-flop DF2 of the selector controller $C_{ji}$ and have their outputs connected to the AND gates 27 and 28 of each of the link selectors $S_{ji,1}$ to $S_{ji,p}$, respectively. Accordingly, if the value b of the BC bit latched in the flip-flop DF3 of the BC controller $B_{ji}$ is "0", then one of the AND gates 27 and 28 of the selectors $S_{ji,1}$ to $S_{ji,p}$ is opened in accordance with the value $h_i$ of the ith bit of the header H latched in the flip-flop DF2 of the selector controller $C_{ji}$. If the value b of the BC bit latched in the flip-flop DF3 of the BC controller $B_{ji}$ is "1", then the value "1" is applied via the OR gates 33 and 34 of the selector controller $C_{ji}$ to the AND gates 27 and 28 of the link selectors $S_{ji,1}$ to $S_{ji,p}$, opening both of the AND gates 27 and 28. As a result, the parallel p-bit information data provided from the link $X_{ji}$ and latched in the data latches $D_{ji,1}$ to $D_{ji,p}$ is provided on both the links $X_{j(j+1)}$ and $Y_{(j+1)i}$ via the AND gates 27 and 28 of the link selectors $S_{ji,1}$ to $S_{ji,p}$ regardless of the value of the header bit $h_i$. By performing the broadcast connection for one of the n input lines, the parallel p-bit information data M applied to the input line is provided on all of the n output lines at different ones of n successive system clock positions, respectively.

In the embodiment shown in FIG. 7 or 9 the length of information data to be dealt with as a cluster (e.g. p-bit word) at each element may either shorter or not shorter than an entire block of information to be transferred from a desired one of the input lines to one of the output lines. In either case, each information data must contain a header H since the block of information is to be subjected to routing control for each p-digit word or n- digit word. When the bit length of one word is relatively short the occupancy ratio of the amount of the header H in one word increases, impairing the routing efficiency for the input information data by the self-routing switch. When the bit length (p or n) of one word is increased for raising the routing efficiency, the amount of hardware of each store/switch element $E_{ji}$ which concurrently processes parallel bits of each word will increase, as will be seen from FIG. 8 or 11. As a solution to this problem, the switch can be constituted for routing a continuous information block (i.e. a unit of switching corresponding to a packet in packet switching) of a desired length which includes only one header and is an integral multiple of the p-digit word (or n-digit word), that is, a variable-length information block. To this end, each element $E_{ji}$ shown in FIG. 7, for instance, needs only to be formed as depicted in FIG. 12.

Figure 12:
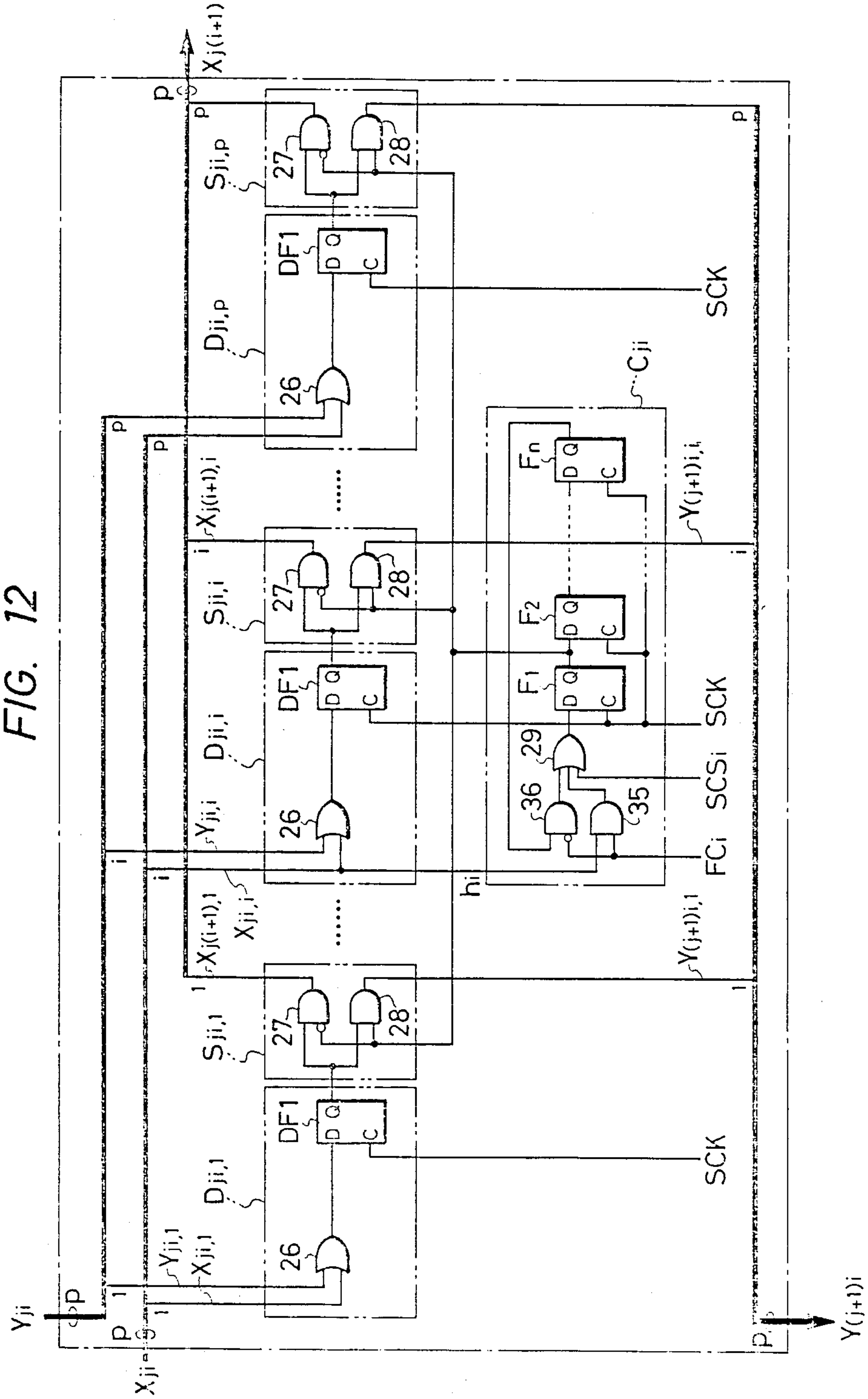
FIG. 12 is a circuit diagram showing the constitution of each element $E_{ji}$ in the case where the self-routing switch of FIG. 7 is adapted for use with a variable-length information block.

The element $E_{ji}$ depicted in FIG. 12 differs from that of FIG. 8 only in that the construction of the selector controller $C_{ji}$. In FIG. 12 the selector controller $C_{ji}$ comprises n cascade-connected flip-flops $F_1$ to $F_n$, AND gates 35 and 36 to which the ith bit $h_i$ of the header H and the output of the flip-flop $F_n$ are applied, respectively, and an OR gate 29 through which the outputs of these AND gates are applied to the input of the flip-flop $F_1$. The AND gates 35 and 36 are each supplied with a fetch control signal $FC_i$ at predetermined timing of the system clock SCK. When supplied with the fetch control signal $FC_i$, the AND gate 35 is opened and the header bit $h_i$ is entered into the flip-flop $F_1$ via the OR gate 29. Upon occurrence of the next system clock SCK the fetch control signal $FC_i$ goes to "0" and the AND gate 36 is opened. The header bit $h_i$ thus entered is shifted through the flip-flops $F_1$ to $F_n$ in synchronism with the system clock SCK and it returns to the flip-flop $F_1$ passing through the AND gate 36 and the OR gate 29 being enabled. In this manner, the input header bit $h_i$ makes a circulation through the flip-flops $F_1$ to $F_n$ every n system clocks. Accordingly, the header bit $h_i$ is applied to all the link selectors $S_{ji,1}$ to $S_{ji,p}$ of the element $E_{ji}$ every n system clocks. In this way, the information block of a length which is an integral multiple of p is successively sliced for each p-digit word. The ith bit of the leading p-digit word slice is held as the header bit $h_i$ in the element $E_{ji}$ of each ith switching stage $\mathbf{12}_i$ and the succeeding parallel p-digit word slices which are entered every n system clocks are processed for routing, under control of the header bit $h_i$ held as mentioned above.

As described previously with respect to the timing charts depicted in FIGS. 5A through 5H, information data applied to the switch from the same input line and having the same header H are supplied, at intervals of n system clocks, to each store/switch element $E_{ji}$ through which they are to pass. In this case, there is the possibility that, in between every nth system clock train, information data from other input lines may enter as similar every nth clock trains. In general, p-digit word slices of any information block may enter each of the elements $E_{1i}$ to $E_{ni}$ of the ith switching stage $\mathbf{12}_i$ at intervals of $2^{k-i+1}$ (i.e. $n/2^{i-1}$) system clocks at the shortest. Moreover, the number of p-digit word slices of information blocks which may be entered from different input lines into each element $E_{ji}$ during consecutive n system clocks is $2^{i-1}$. Accordingly, it is arranged such that the fetch control signal $FC_i$ which is applied to the selector controller $C_{ji}$ of each element $E_{ji}$ can be provided at a desired clock position of every $2^{k-i+1}$ system clocks. When the routing processing for an information block of a bit length which is an integral multiple of p, for instance, l times longer than p, is completed by performing the routing operation l times, at intervals of n system clocks, the fetch control signal $FC_i$ is applied to the selector controller $C_{ji}$ at the clock position for latching the leading p-digit word slice of the next information block into the data latches $D_{ji,1}$ to $D_{ji,p}$. By this, a new header bit $h_i$ is fed into the flip-flop $F_1$ and held cyclically through the flip-flops $F_1$ to $F_n$ one after another. As will be understood from the above, by a suitable selection of the clock position for generating the fetch control signal $FC_i$, a self-routing switch can be obtained which is capable of routing a variable-length information block.

Figure 13:
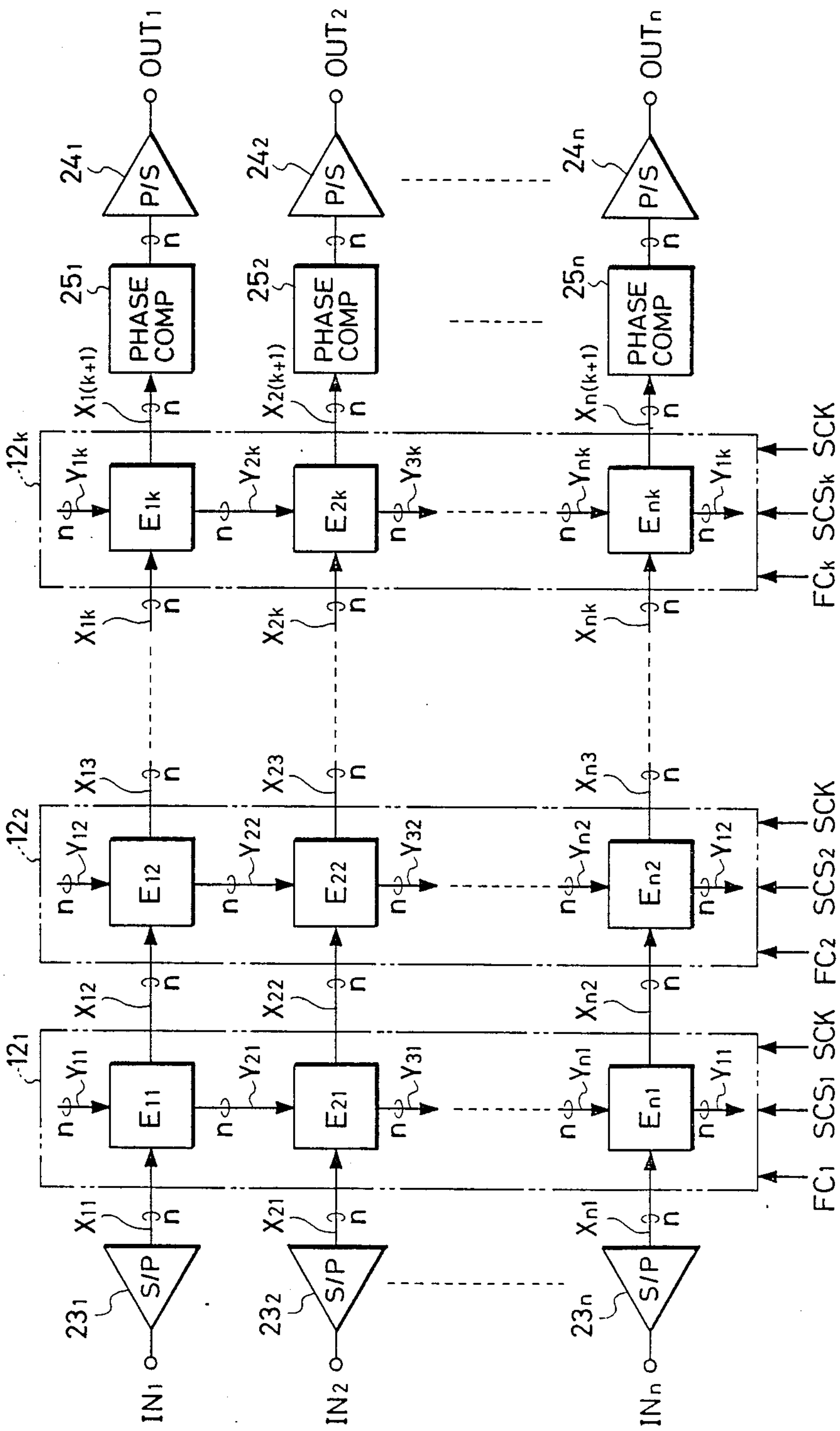
FIG. 13 is a block diagram illustrating another embodiment of the self-routing switch for the variable-length information block.

In the above embodiment, since all the flip-flops DF1 for latching information bits of parallel p bits are driven simultaneously, a large drive current is needed, leading to the defect that a high-speed operation is limited. FIG. 13 illustrates an embodiment in which the drive timings for the flip-flops are distributed so as to avoid this defect.

Figure 14:
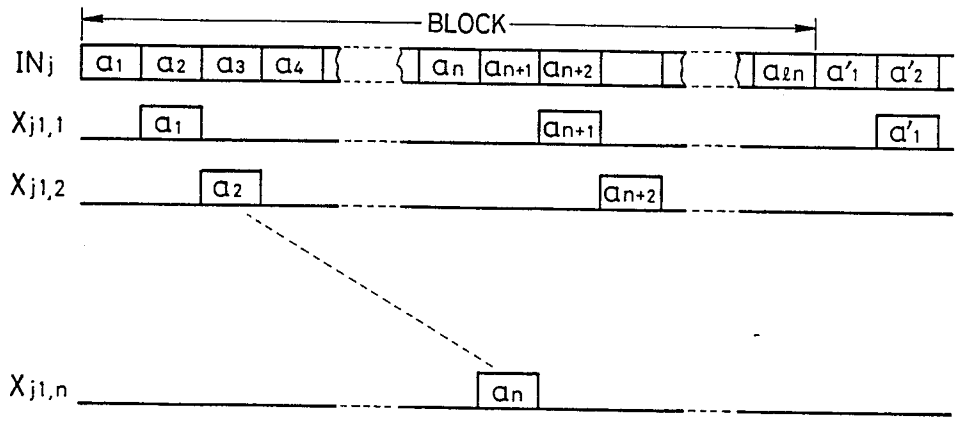
FIG. 14 is a timing chart for explaining the operation of a serial-parallel converter $23_j$ in FIG. 13.

FIG. 13 shows a self-routing switch which has $n=2^k$ input/output lines and k switching stages and performs the routing of an information block every parallel n-digit word slice. The interconnection of the switching stages $\mathbf{12}_1$ to $\mathbf{12}_k$ and the interconnection of the store/-switch elements $E_{1i}$ to $E_{ni}$ in each switching stage are the same as in the embodiment of FIG. 7. This embodiment is similar to that of FIG. 12 in that each element $E_{ji}$ is equipped with the header bit holding function, but differs from the latter in that in FIG. 13 the parallel n-digit word slice is processed, bit by bit, with consecutive n system clocks. To perform such processing, each of serial-parallel converters $\mathbf{23}_1$ to $\mathbf{23}_n$ connected to the input lines $IN_1$ to $IN_n$ converts each n-digit word slice of the input information block (of an $l\times n$ bits length, where l is an integer equal to or greater than 1) to n parallel bits, and outputs them one after another in synchronism with the system clock, starting at the head of the block. FIG. 14 shows the relationship between the bit string $a_1a_2 \ldots a_{ln}$ of the information block input into the input line $IN_j$ and the information block bits converted by the serial-parallel converter $\mathbf{23}_j$ and output therefrom onto the parallel n-bit input link $X_{ji}$, that is, $X_{jl,1}$ to $X_{ji,n}$. The k bits $a_1$ to $a_k$ at the head of the block constitute the header H. The thus shifted parallel n-digit word slice is routing-processed, as it is, in the switching stages $\mathbf{12}_1$ to $\mathbf{12}_k$ one after another. The shifted parallel n bits output from each output link $X_{j(k+1)}$ of the final switching stage $\mathbf{12}_k$ are converted by a parallel-serial converter $\mathbf{24}_j$ and provided on the same output line, as a serial bit string while bearing the original clock position relation to one another.

Figure 15:
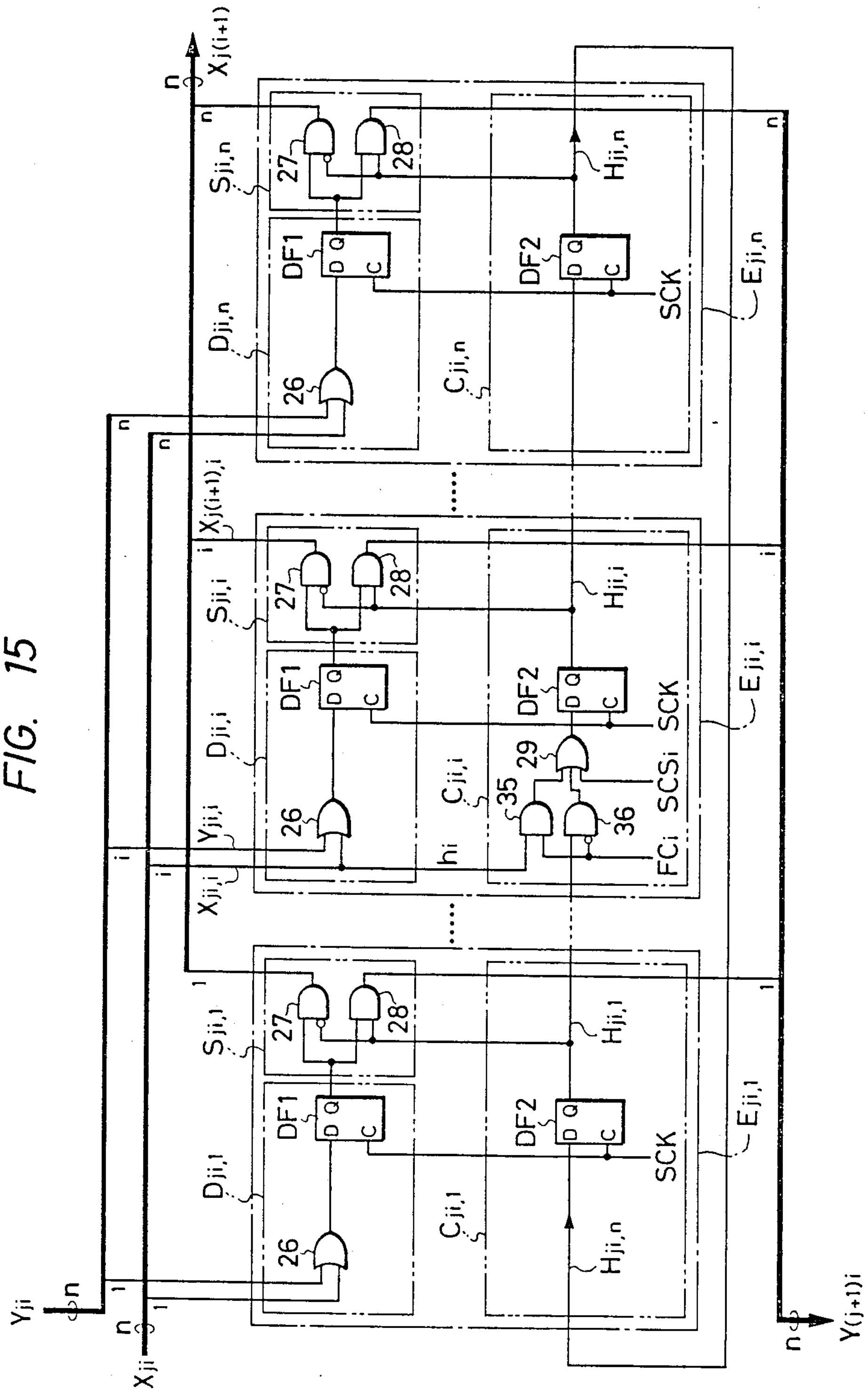
FIG. 15 is a circuit diagram showing the constitution of the element $E_{ji}$ in FIG. 13.

The internal structure of the element $E_{ji}$ in FIG. 13 is shown in FIG. 15, in which, as is the case with FIG. 8 or 12, n data latches $D_{ji,1}$ to $D_{ji,n}$ are connected to input link $X_{ji}$ of parallel n-bit lines $X_{ji,1}$ to $X_{ji,n}$ and internal link $Y_{ji}$ of parallel n-bit lines $Y_{ji,1}$ to $Y_{ji,n}$, respectively, and n link selectors $S_{ji,1}$ to $S_{ji,n}$ are connected to output link $X_{j(i+1)}$ of parallel n-bit lines $X_{j(i+1),1}$ to $X_{j(i+1),n}$ and internal link $Y_{(j+l)i}$ of parallel n-bits lines $Y_{(j+1)i,1}$ to $Y_{(j+)i,n}$, respectively. Furthermore, in this embodiment a selector controller $C_{ji,f}$ (where f=1, 2, . . . n) having a flip-flop DF2 is provided for each pair of the data latch $D_{ji,f}$ and the link selector $S_{ji,f}$. The set of the data latch $D_{ji,f}$, the link selector $S_{ji,f}$ and the selector controller $C_{ji,f}$ corresponding to the same bit line number f will hereinafter be referred to as a sub-element $E_{ji,f}$. The n flip-flop DF2 are cyclically cascade-connected, constituting an n-bit circulated shift register. The selector controller $C_{ji,i}$ corresponding to the ith bit line is connected to the ith bit line so that it receives the ith header bit $h_i$ in synchronism with the fetch control signal $FC_i$ as in the case of FIG. 12.

Figure 16:
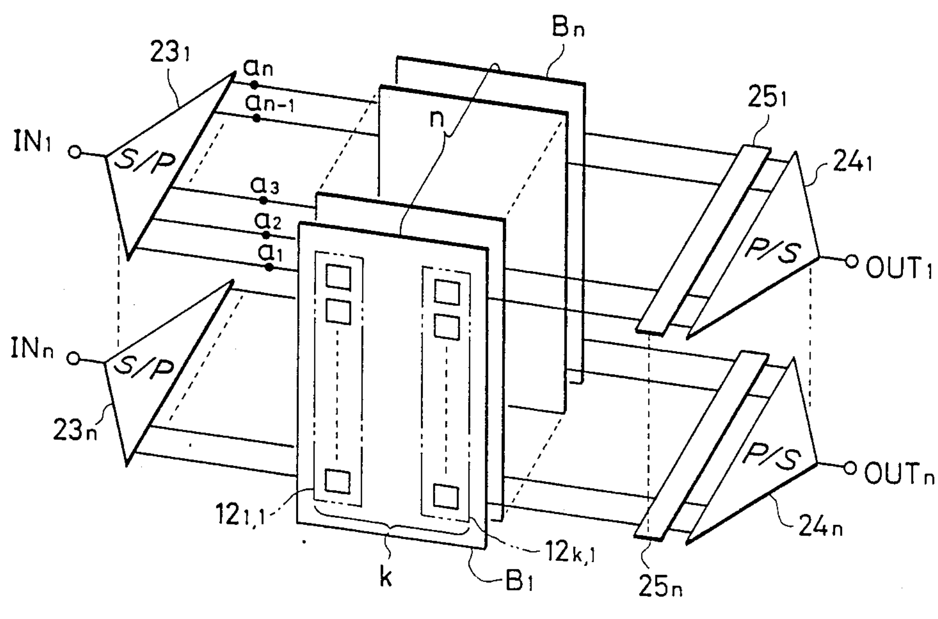
FIG. 16 is a diagram for explaining the present invention, with the element of FIG. 16 shown in a simplified form and the switch of FIG. 13 three-dimensionally.
Figure 17:
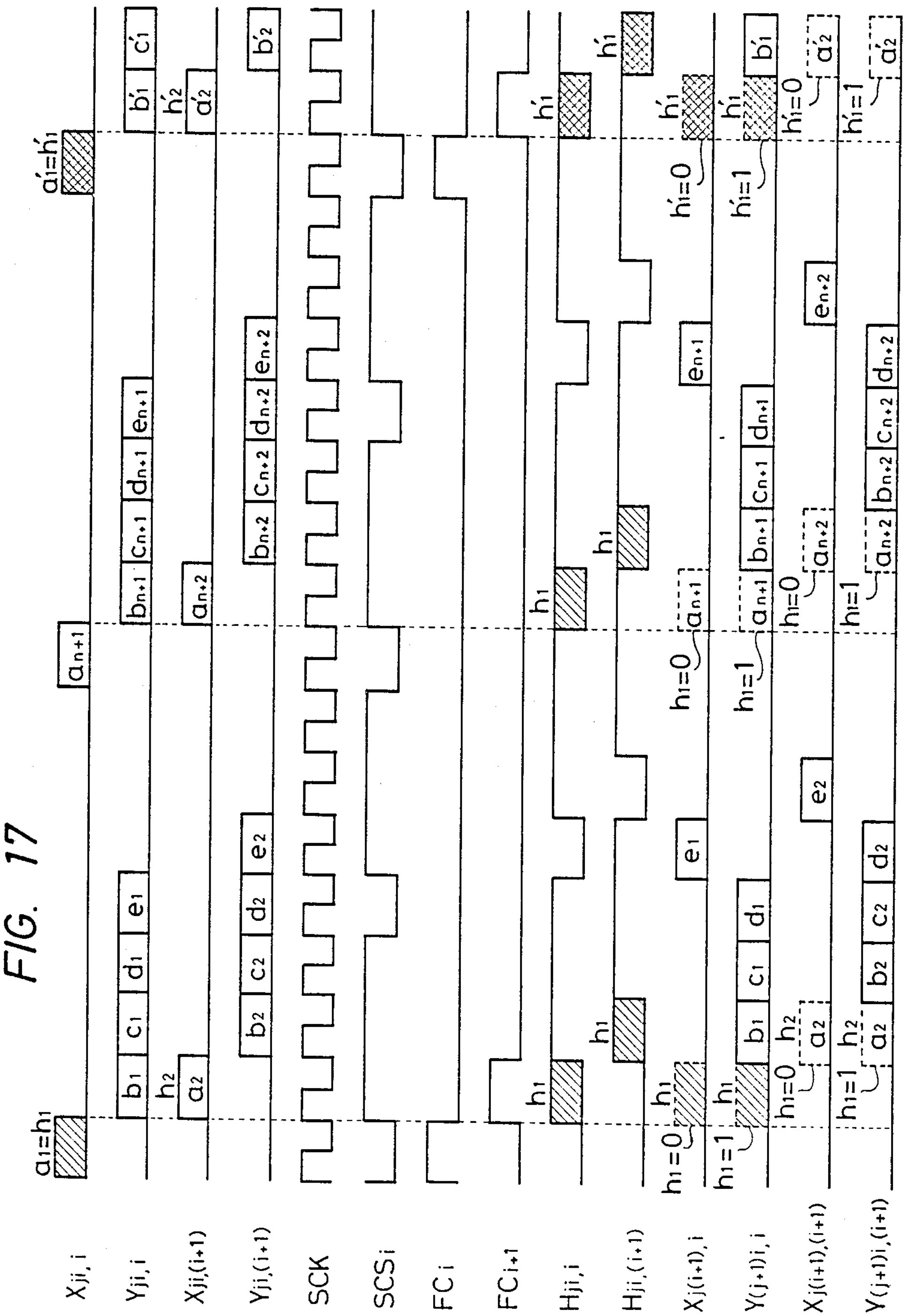
FIG. 17 is a timing chart for explaining the operation of the element $E_{ji}$ depicted in FIG. 15.

FIG. 16 is a three-dimensional representation of the constitution of the embodiment shown in FIG. 13. That is, all the sub-elements $E_{ji,1}$ of all the store/switch elements $E_{ji}$ associated with the first bit line of parallel n bits are shown in a first bit plane $B_1$, and similarly, all the sub-elements $E_{ji,f}$ associated with an fth bit line are shown in an fth bit plane $B_f$. The first to kth bit planes $B_1$ to $B_k$ are header bit planes as well, and therefore, they may also be called control planes. The output parallel n bits $a_1$ to $a_n$, indicated by dots, show the positional relationship of the output clocks, indicating that the bits are output in the order of $a_1, a_2, \ldots a_n$, Next, a description will be given, with reference to FIG. 17, of the operation of the element $E_{ji}$ depicted in FIG. 15. In FIG. 17, time charts are shown assuming n=8, i=1 (i.e. the first switching stage $12_1$) and each information block is 16-bit long. As described previously in connection with FIG. 14, the n-digit word slice of information block which is applied to each input link $X_{jl}$ of the first switching stage has its n bits shifted one system clock apart from one another, and the n-digit word slice is retained in this shifted state while it passes through the switching stages $12_1$ to $12_k$. Accordingly, respective bits of the n-digit word slice which is applied to each store/switch element $E_{ji}$ depicted in FIG. 15 are also shifted one system clock apart from one another on the n parallel bit lines $X_{ji,1}$ to $X_{ji,n}$. The k-bit (where k=3, in this example) header ($h_1$, $h_2$, $h_3$) is appended to the beginning of the information block. Consequently, the header bit $h_1$ ($a_1$ in FIG. 14) is first applied to a first bit line $X_{ji,i}$ (where i=1) of the input link (row $X_{ji,i}$ in FIG. 17) and is fed by the clock SCK to the flip-flop DF1 of a first data latch $D_{ji,i}$ (where i=1). At the same time, it is also applied to the flip-flop DF2 of a first selector controller $C_{ji,i}$ (where i=1), by the fetch control signal $FC_i$ which is generated at the same timing as the application of the header bit $h_1$ to the flip-flop DF1 (row $H_{ji,i}$ in FIG. 17). Depending on whether the header bit $h_i$ (where i=1) is 37 0" or "1", it is output from the data latch $D_{ji,i}$ (where i=1) to a first bit line $X_{j(i+1),i}$ (where i=1) of the output link or a first bit line $Y_{(j+1)i,i}$ (where i=1) of the lower internal link (row $X_{j(i+1),i}$ or $Y_{(j+1)i,i}$). The header bit $h_i$ fed to the flip-flop DF2 is shifted through the n cyclically cascade-connected flip-flops DF2 upon each occurrence of the system clock SCK, as shown on rows $H_{ji,i}$ and $H_{ji,(i+1)}$ in FIG. 17, and the header bit $h_i$ appears again in the flip-flop DF2 of the selector controller $C_{ji,i}$ (where i+1) after n clocks. By the header bit $h_1$ thus returned to the flip-flop DF2 of the above-said selector controller $C_{ji,i}$, the output direction of the next information bit $a_{n+1}$, which appears on the first bit line of the input link n (=8) system clocks after the first information bit $a_1$, is controlled in the same manner as mentioned previously. The information bit $a_{n+1}$ is information bit data in the same information block, except the header, which has to be provided on the same output line. Accordingly, no fetch control signal $FC_i$ generated at the timing when the information bit $a_{n+1}$ appears.

Also in this embodiment each store/switch element always repeat the outputting of the n-digit word slice to the succeeding state and the shift to the lower element in a predetermined timing relation, as in the embodiment described previously. That is, a row $Y_{ji,i}$ in FIG. 17 shows a maximum of $2^{(k-1)}$ information bits $b_1$, $c_1$, $d_1$ and $e_1$ which may continuously be shifted from the upper link $Y_{ji,i}$ one clock behind the header bit $h_1$ of the input link $X_{ji,i}$ (where i=1). These information bits are shifted from the upper link $Y_{ji,i}$ for a period during which the shift control signal shown on a row $SCS_1$ is "1" (for three system clocks). Accordingly, the bits $h_1$, $b_1$, $c_1$, $d_1$ and $e_1$ are each latched in the flip-flop DF1 of the data latch $D_{ji,i}$ in this order upon each occurrence of the system clock. On the other hand, the flip-flop DF2 of the selector controller $C_{ji,i}$ latches the header bit $h_1$, which is obtained from the AND gate 35 when the fetch control signal $FC_i$ is applied thereto, and the shift control signal $SCS_i$ (3-clocks long), as depicted on a row $H_{ji,i}$ in FIG. 17. As a result of this, if the header bit $h_1$ is "0", then it is provided on the ith bit line of the output link $X_{j(i+1)}$, as shown on a row $X_{j(1+1),i}$ in FIG. 17, and then, for the next three system clocks during which the shift control signal $SCS_i$ has logic "1", the information bits $b_1$, $c_1$ and $d_1$ are sequentially output on the ith bit line of the lower link $Y_{(j+1)i}$, as shown on the row $Y_{(j+1)i,i}$. When the shift control signal $SCS_i$ goes to "0", the output of the flip-flop DF2 of the selector controller $C_{ji,i}$ also goes to "0", in consequence of which the information bit $e_1$ latched in the flip-flop DF1 of the data latch $D_{ji,i}$ at that time is delivered on the ith bit line of the output link $X_{j(i+1)}$, as shown on the row $X_{j(i+1),i}$ in FIG. 17. Where the header bit $h_1$ is "1", the output of the flip-flop DF2 shown on the row $H_{ji,i}$ goes to and remains at "1" level for four clocks inclusive of one caused by $h_1=1$. As a result of this, the bits $h_1$, $b_1$, $c_1$ and $d_1$ are sequentially output onto the ith bit line of the lower link $Y_{j(i+1)}$, as depicted on the row $Y_{j(i+1,i}$, and by the next clock, the information bit $e_1$ is output onto the ith bit line of the output link $X_{j(i+1)}$. The same is true of the other bit lines. After completion of the routing operation for the information block of $1\times n$ bits, a header bit $h_1'$ of the next information block is entered in response to a fetch control signal $FC_1$ for performing the routing operation of the next information block.

The following point must be noted here. The first bit $a_1$ of a first n-digit word slice of the information block to be processed for routing, that is, the first bit $h_1$ of the header, first enters a certain element of the first switching stage $12_1$, and the first bit $h_1$ is fed from a first one of n parallel bit lines of the input link of that element to a first data latch and a first selector controller associated with the first bit line (rows $X_{ji,i}$ and $FC_i$ in FIG. 17), thereby specifying the direction in which the n-digit word slice is to be transferred (row $X_{j(i+1),i}$ or $Y_{(j+1)i,i}$). Next, when the n-digit word slice enters a certain element of the second switching stage $12_2$, the second bit $a_2$ of the n-digit word slice, that is, the second bit $h_2$ of the header, is fed from a second bit line of the input link of that element to a second data latch and a second selector controller associated with the second bit line. In this instance, the first bit $a_1=h_1$ was already latched in the first data latch of the same element one system clock prior to the above. Accordingly, the first bit $a_1$ was subjected to routing control by a cyclically shifted previous header bit which happened to enter the first selector controller of the element at that time, and it would be indefinite to which one of the output links of the final switching stage the first bit $a_1$ will ultimately be provided. Also in the third switching stage $12_3$, the second bit $a_2$ or the second header bit $h_2$ already used in the second switching stage $12_2$ is subjected to indefinite routing processing. Thus, the routing processing of k−1 header bits $h_1, h_2, h_3, \ldots h_{(k-1)}$ themselves are indefinite. However, since these header bits subjected to indefinite routing processing were already fed to corresponding ones of the n cyclically cascade-connected flip-flops DF2 at correct timings in the switching stages corresponding to them before they are subjected to the indefinite routing processing and thereafter they have been held cyclically in the flip-flops DF2, correct routing processing for a series of n-digit word slices following the first n-digit word slice can be repeatedly performed in the respective switching stages. Each header bit to be subjected to processing after being once used is unnecessary in the succeeding switching stage, and hence can be removed.

As described above, in the embodiment shown in FIGS. 13 to 17, since the header bit $h_i$ fed to the selector controller $C_{ji,i}$ from the ith bit line of each input link $X_{ji}$ in the ith switching stage is cyclically shifted through the n selector controllers $C_{ji,1}$ to $C_{ji,n}$ in synchronism with the system clock, the header bit $h_i$ moves following the shifted bits of the parallel n-digit word slice which are applied to the n parallel bit lines of the input link $X_{ji}$; and so that the direction of output of the bits can be controlled by the header bit.

Figure 18:
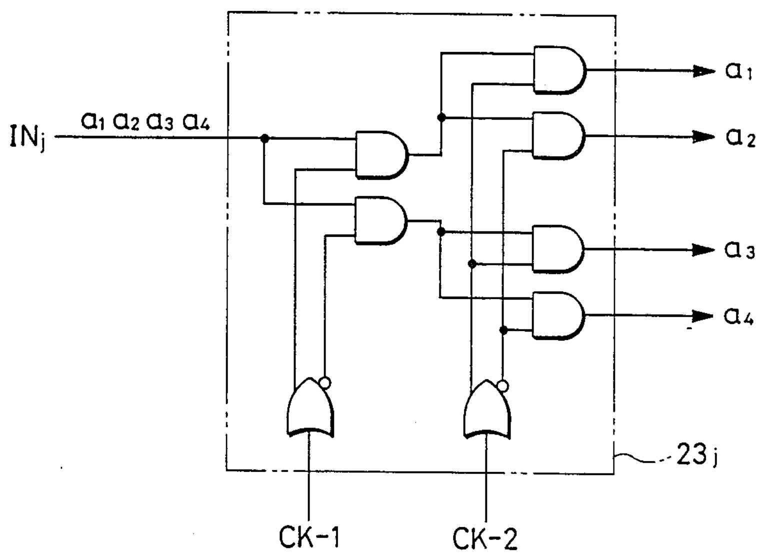
FIG. 18 is a circuit diagram illustrating an example of the serial-parallel converter $23_j$ in FIG. 13.
Figure 19:
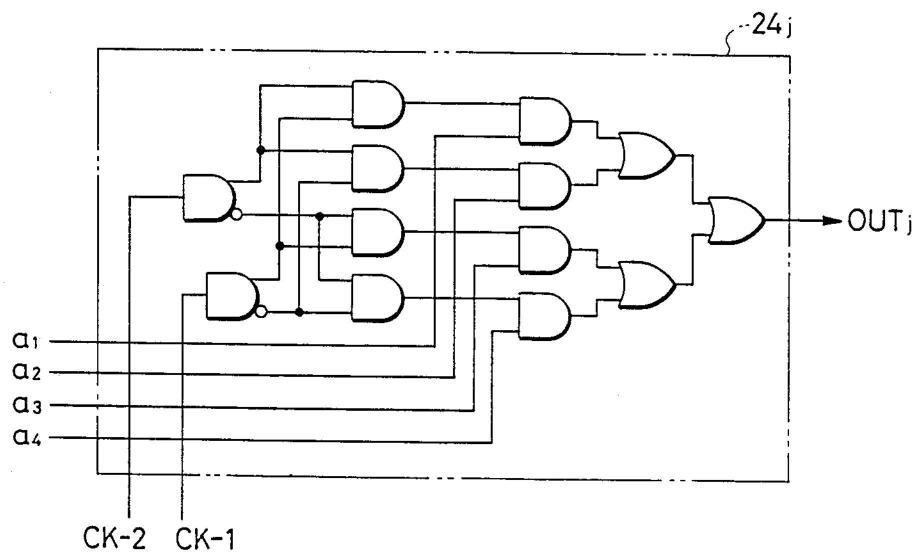
FIG. 19 is a circuit diagram showing an example of a parallel-serial converter $24_j$ in FIG. 13.
Figure 20:
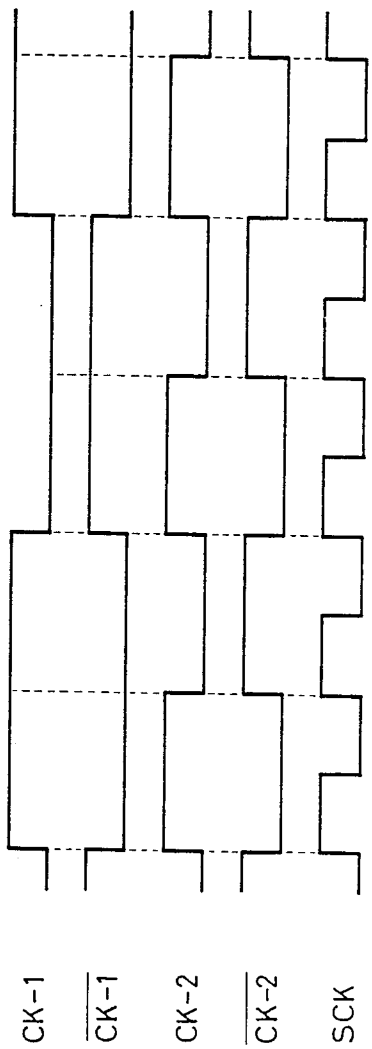
FIG. 20 is a timing chart showing clock signals for use in FIGS. 18 and 19.

FIGS. 18, 19 and 20 respectively show examples of the serial-parallel converters $23_1$ to $23_n$ and the parallel-serial converters $24_1$ to $24_n$ used in the embodiment of FIG. 13 and clock signals CK-1 and CK-2 for driving them. For the sake of brevity, assume that n=4. The serial-parallel converter $23_j$ depicted in FIG. 18 converts the input bit string $a_1a_2a_3a_4$ to parallel bits and provides them, one by one, on the parallel 4-bit lines upon each occurrence of the system clock SCK. The parallel-serial converter $24_j$ in FIG. 19 converts such shifted parallel four bits $a_1$, $a_2$, $a_3$ and $a_4$ into a single stream.

Figure 21:
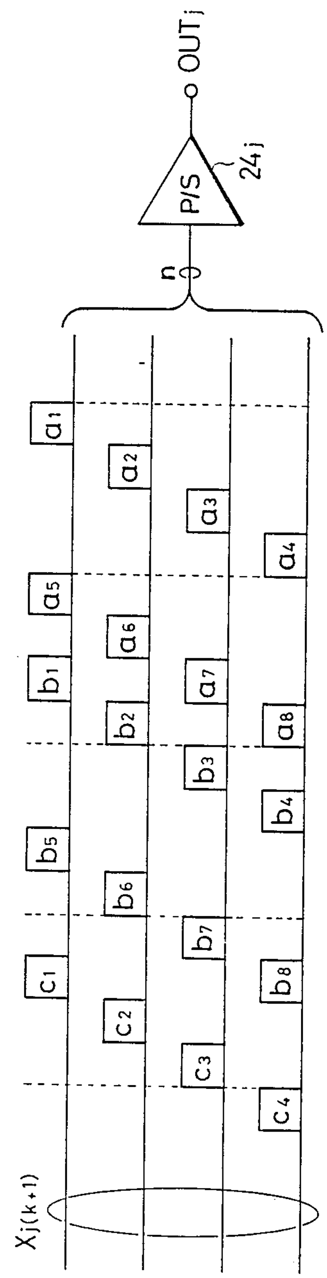
FIG. 21 is a timing chart for explaining information bit streams which are provided from an output link $X_{j(k+1)}$ of the final switching stage in FIG. 13.
Figure 22:
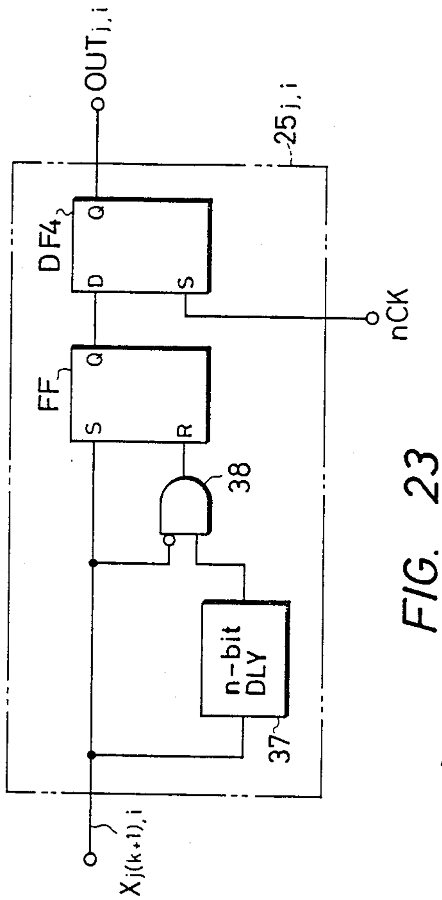
FIG. 22 is a circuit diagram showing an example of a phase compensator $25_{j,i}$ in FIG. 13.
Figure 23:
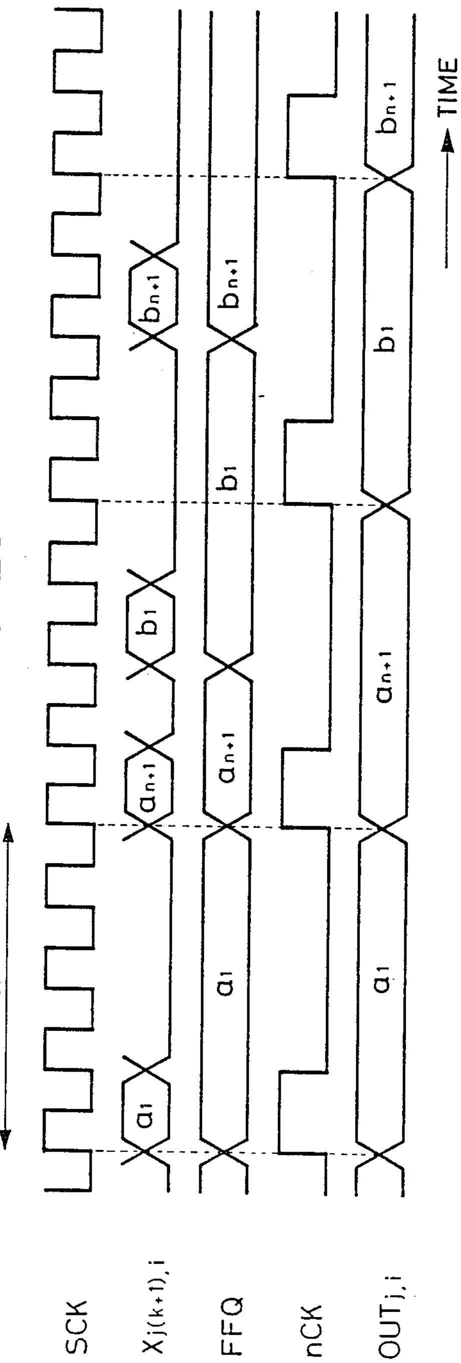
FIG. 23 is a timing chart for explaining the operation of the phase compensator depicted in FIG. 22.

Now, let it be assumed, for the sake of simplicity, that n=4 and k=2 in the embodiment of FIG. 13. Bits $a_1, a_2, \ldots a_8$ of an information block, which are input from a certain input line, will be output on parallel n-bit lines of a certain output link $X_{j(k+1)}$ of the final switching stage $12_k$, at intervals of n=4 clocks ($a_1$, $a_5$, for instance) on each bit line, as shown in FIG. 21. However, when information bits $b_1, b_2, \ldots b_8$ of another information block are applied from another input line towards the same output link $X_{j(k+1)}$ as in the above after completion of the input of one information block from the first-mentioned input line, routing of these information bits differs from routing of the information bits of the preceding information block and there is a time difference corresponding to the difference between the routes, so that the output phases of the information bits $(b_1, b_5), (b_2, b_6), \ldots, (b_4, b_8)$ differ from the output phases of the bits $(a_1, a_5), (a_2, a_6), \ldots, (a_4, a_8)$. If these information bits $b_1, b_2, \ldots b_8$ are applied, as they are, to the parallel-serial converter $24_j$ for conversion into serial form, errors will occur. To avoid this, a phase compensator $25_j$ is connected between each output link $X_{j(k+1)}$ and the parallel-serial converter $24_j$ in FIG. 13. FIGS. 22 and 23 respectively show an example of the phase compensator $25_j$ and its operation timing chart.

The phase compensator $25_{j,i}$ depicted in FIG. 22 is one of the phase compensators which are connected to the parallel n bit lines of each output link $X_{j(k+1)}$ of the final kth switching stage. The phase compensator $25_{j,i}$ is made up of a set/reset flip-flop FF which is set by an input signal, a flip-flop DF4 which is connected to the Q output of the flip-flop FF and stores therein its content by a clock signal nCK which is produced at intervals of n system clocks, a delay circuit 37 which delays the input signal for n bits, and an AND gate 38 which ANDs the delayed output from the delay circuit 37 with an inverted version of the input signal. The AND gate 38 and the flip-flop DF4 constitute a set-preference S/R-flip-flop. Of information bits $a_1$ to $a_{2n}$ of one information block applied to the same input line, information bits $a_i$ and $a_{n+i}$ of the corresponding bit numbers i, (i+n) in the n-digit word slices which appear every n clocks, will appear on the ith bit line $X_{j(k+1),i}$ of the output link $X_{j(k+1)}$, as depicted on the row $X_{j(k+1),i}$ in FIG. 23, where i=1, for example. When an information block is input from another input line toward the same output link upon completion of the input of the above information block as referred to previously, the clock phases for outputting the bits $b_1$ and $b_{n+1}$ are shifted from those for the bits $a_1$ and $a_{n+1}$, as indicated by $b_1$ and $b_{n+1}$ on the row $X_{j(k+1),i}$ of FIG. 23. In such a case, the phase compensator $25_{j,i}$ outputs the information bits at fixed intervals of n clocks as shown on the row $OUT_{j,i}$. Suppose that the flip-flop FF is held reset in its initial state, for instance. If the input bit $a_1$ is "0", then the flip-flop FF will remain reset, that is, it will hold the bit $a_1$. Where the subsequently input bit $a_{n+1}$ is "1", the flip-flop FF is set and holds the bit $a_{n+1}$. When the bit $a_{n+1}$ is "0", the flip-flop FF holds the bit $a_{n+1}$. If the bit $a_1$ is "1", then the flip-flop FF will be set, holding the bit $a_1$. If the subsequently input bit $a_{n+1}$ is "1", then the flip-flop FF will remain in the set state, that is, it will hold the bit $a_{n+1}$. When the bit $a_{n+1}$ is "0", the bit $a_{n+1}=0$ is applied to the AND gate 38, together with the n-clock delayed bit $a_1=1$ from the delay circuit 37, and the output "1" of the AND gate 38 is applied to the flip-flop FF to reset it to hold the bit $a_{n+1}=0$. After all, the input bit information is always held by the flip-flop FF until the next bit information is input, as indicated on the row FFQ in FIG. 23. The respective states thus held in the flip-flop FF is latched, by the clock nCK, into the flip-flop DF4, from which are obtained outputs $a_1$, $a_{n+1}$, $b_1$, $b_{n+1}$ of regularly compensated phases as shown on the row $OUT_{j,i}$.

Figure 24:
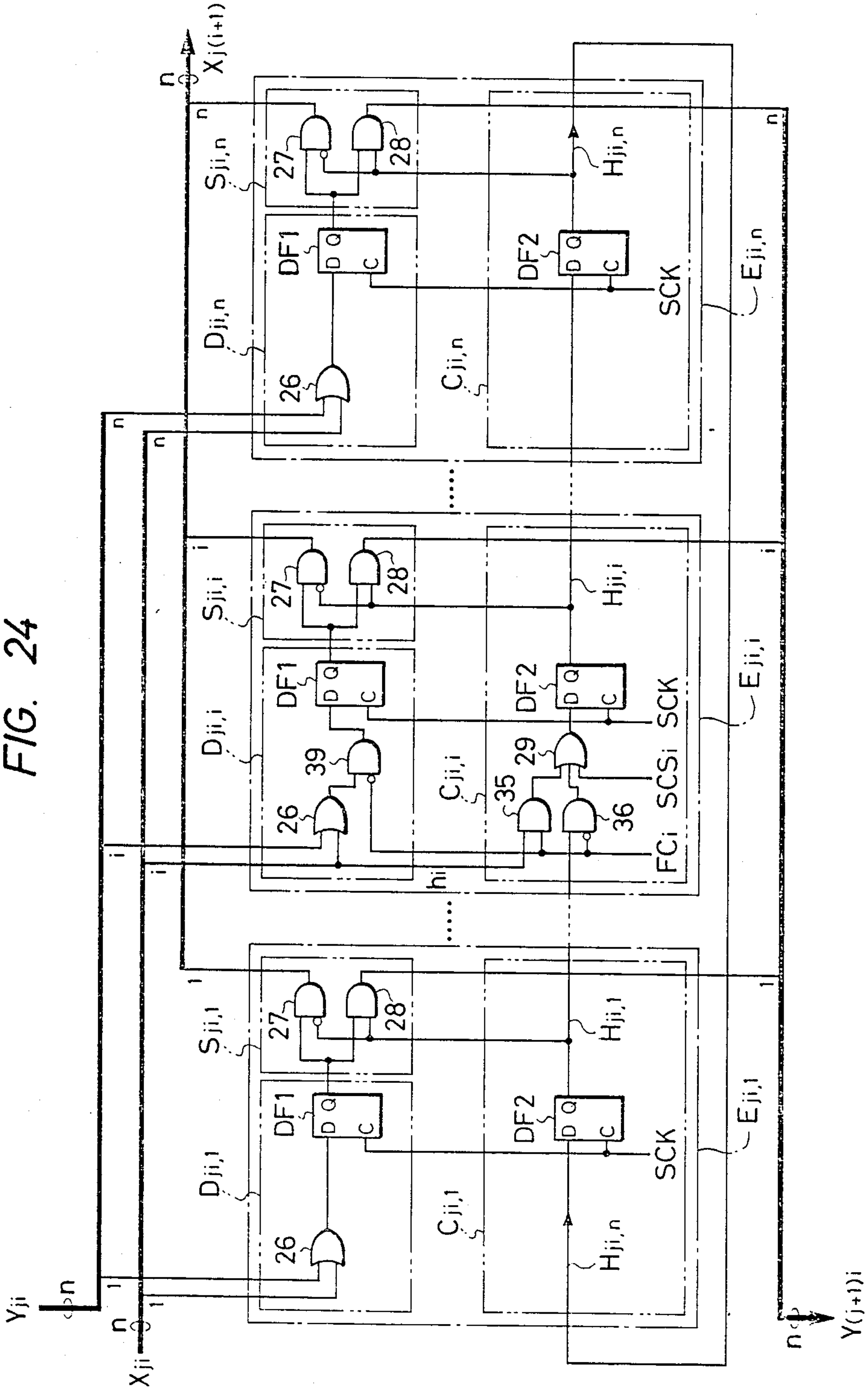
FIG. 24 is a circuit diagram illustrating the constitution of each element $E_{ji}$ in case where the embodiment depicted in FIG. 13 is adapted for use with a variable-length information block.

As described previously, in the embodiment of FIG. 15 the header bits $h_1, h_2, \ldots h_{k-1}$ used in the switching stages $12_1$ to $12_{(k-1)}$ are subjected to indefinite routing processing in the succeeding stages, respectively, and hence they are unnecessary. FIG. 24 illustrates the store/switch element $E_{ji}$ modified so that these used header bits are immediately removed in the respective switching stages. This store/switch element differs from that shown in FIG. 15 in that an AND gate 39 is provided at the input side of the flip-flop DF1 in the ith data latch $D_{ji,i}$ associated with the bit line i to which the header bit $h_1$ is applied. When the fetch control signal $FC_i$ is applied for inputting the header bit $h_i$ into the ith selector controller $C_{ji,i}$, the AND gate 39 is closed by the signal, preventing the application of the header bit $h_i$ to the flip-flop DF1 of the data latch $D_{ji,i}$. Except for the foregoings, this modified store/switch element is exactly identical in construction and operation with the store/switch element depicted in FIG. 15.

Figure 25:
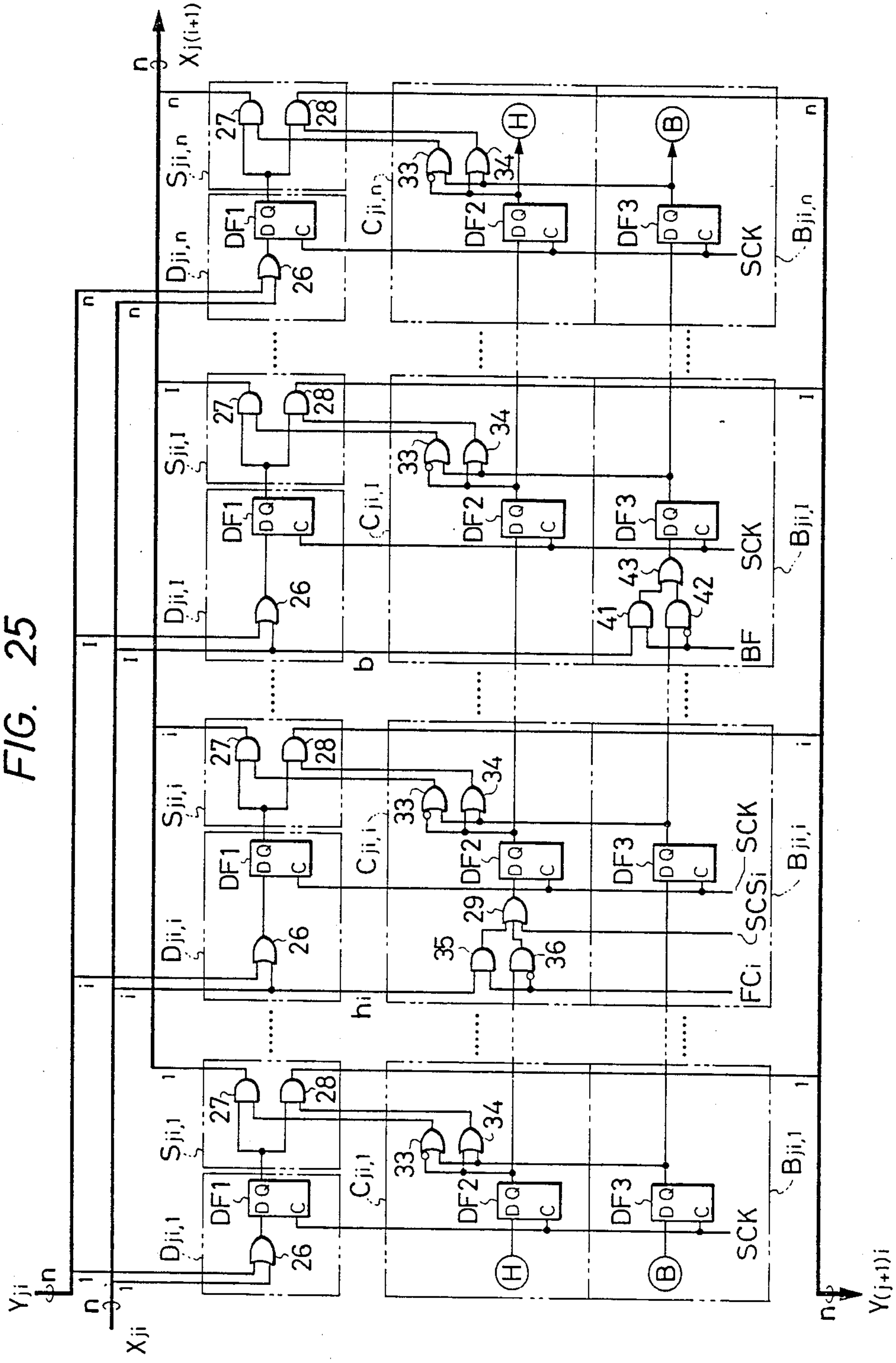
FIG. 25 is a circuit diagram showing the element $E_{ji}$ of FIG. 24 in the case where it is equipped with a broadcast connection function.

FIG. 25 illustrates an embodiment of each store/switch element which is employed in the case where the self-routing switch shown in FIG. 13 is additionally equipped with the broadcast connection function. This embodiment is a modification of the simple parallel processing type switch having the broadcast connection function, shown in FIG. 11, into the shifted parallel processing type switch depicted in FIG. 15. In the store/switch element $E_{ji}$ of the jth row of the ith switching stage shown in FIG. 25, n data latches $D_{ji,1}$ to $D_{ji,n}$ and n link selectors $S_{ji,1}$ to $S_{ji,n}$ identical in construction with those in FIG. 11 are provided in association with the first to nth bit lines of the input link $X_{ji}$, the output link $X_{j(i+1)}$, the upper internal link $Y_{ji}$ and the lower internal link $Y_{(j+1),i}$, respectively. Furthermore, n selector controllers $C_{ji,1}$ to $C_{ji,n}$ are provided respectively corresponding to individual sets of the corresponding data latch and link selector. As is the case with FIG. 15, the selector controllers $C_{ji,1}$ to $C_{ji,n}$ have cyclically cascade-connected flip-flops DF2 for cyclically holding the header bit $h_i$. The outputs of the flip-flops DF2 are applied via the OR gates 33 and 34 to the AND gates 27 and 28 of the corresponding link selectors $S_{ji,1}$ to $S_{ji,n}$, selectively opening the gates 27 and 28. In the ith switching stage there is provided a header input circuit composed of the AND gates 35 and 36 and the OR gate 29, for inputting the ith header bit $h_i$ into the ith selector controller $C_{ji,i}$ for latching in the flip-flop DF2. By applying the fetch control signal $FC_i$ to the input circuit at the clock timing at which the header bit $h_i$ appears on the ith bit line of the input link $X_{ji}$, the AND gate 36 is closed to inhibit the input of the old header bit from the flip-flop DF2 of the preceding selector controller $C_{ji,(i-1)}$ into the input circuit and the AND gate 35 is opened, through which the new header bit $h_i$ is applied to the flip-flop DF2. After this, the thus input header bit $h_i$ is shifted through the n cyclically cascade-connected flip-flops DF2 one after another in synchronism with the system clock SCK.

In the embodiment depicted in FIG. 25 broadcast connection controllers $B_{ji,1}$ to $B_{ji,n}$ for the broadcast connection are provided corresponding to the selector controllers $C_{ji,1}$ to $C_{ji,n}$, respectively. The broadcast connection controllers $B_{ji,1}$ to $B_{ji,n}$ are each provided with a flip-flop DF3, and the n flip-flops DF3 are cyclically cascade-connected, forming an n-bit circulating shift register. The Q outputs of the n flip-flops DF3 are applied to the AND gates 27 and 28 in the corresponding link selectors $S_{ji,1}$ to $S_{ji,n}$ via the OR gates 33 and 34 in the corresponding selector controllers $C_{ji,1}$ to $C_{ji,n}$, respectively.

Since a broadcast connection bit (the BC bit) b is preset at a predetermined bit position I in the first n-digit word slice of each information block, there is provided in the Ith broadcast connection controller $B_{ji,I}$ a BC bit input circuit composed of AND gates 41 and 42 and an OR gate 43, for receiving the BC bit from an Ith bit line of the input link $X_{ji}$ in each store/switch element $E_{ji}$ of each switching stage. With such an arrangement, when a BC bit fetch signal BF is applied at the clock timing at which the BC bit b appear on the Ith bit line of the input link $X_{ji}$, the AND gate 42 is closed inhibiting the input therethrough of the Q output from the flip-flop DF3 of the preceding (I−1)th broadcast connection controller $B_{ji,(I-1)}$. At the same time, the AND gate 41 is opened, through which the new BC bit b is input into the flip-flop DF3 from the Ith bit line via the OR Gate 43. The BC bit b thus input is shifted through the circulating shift register composed of the n flip-flops DF3, one after another in synchronism with the system clock SCK. The Q output of each flip-flop DF3 is applied to the AND gates 27 and 28 of the corresponding link selector via the OR gates 33 and 34 of the corresponding selector controller. Therefore, when the Q output of the flip-flop DF3 goes to "1", the AND gates 27 and 28 are both opened, through which an information bit on the corresponding bit line, latched in the corresponding data latch, is provided on the corresponding bit lines of both of the output link $X_{j(i+1)}$ and the lower internal link $Y_{(j+1)}$, independently of the value of the header bit latched in the flip-flop DF2 of the selector controller. By such a broadcast connection operation in each element, an information block having the BC bit $b=1$, when applied to the self-routing switch from any one of the input lines, is provided on all the output lines.

Although in the embodiments of FIGS. 13 and 25 information blocks input to n input lines are each processed for routing every parallel n-digit word slice shifted bit by bit, it is evident that the self-routing switch can be formed so that the input information blocks can each be processed every p-digit word slice shifted on a bitwise basis, as is the case with FIG. 7. Also in this instance, if $p<n$, it is necessary to adjust the timing for inputting the information blocks into the serial-parallel converters $\mathbf{23}_1$ to $\mathbf{23}_n$ so that parallel p-digit word slice shifted by a series of p system clocks are generated by the converters $\mathbf{23}_1$ to $\mathbf{23}_n$ with an interval of r system clocks intervened between each adjacent slices to satisfy $r+p=n$. If $p \geqq n$, however, the information clocks can be applied successively to the serial-parallel converters in synchronism with the system clock, without the necessity of adjusting their input timing.

Figure 26:
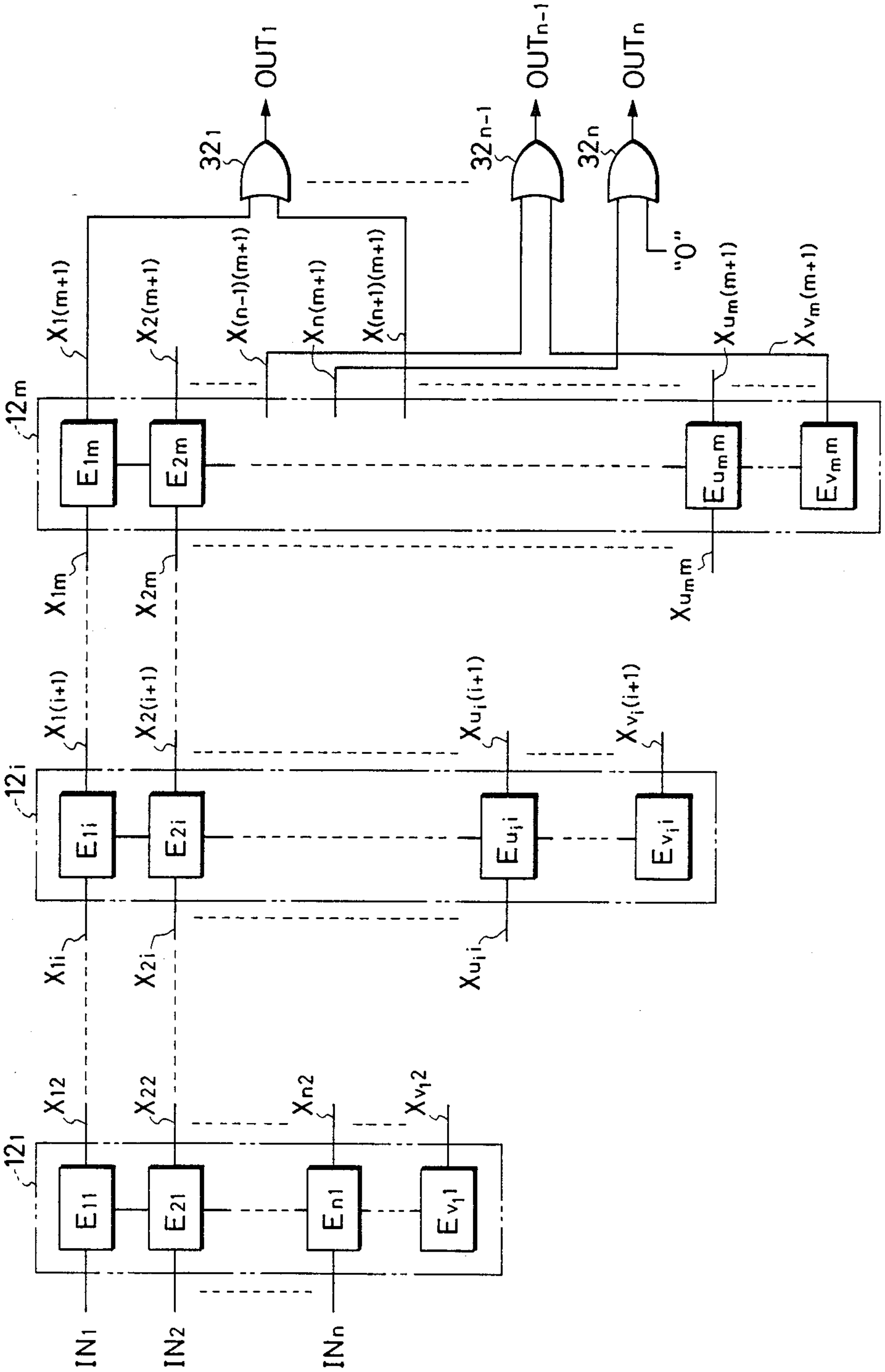
FIG. 26 is a block diagram illustrating another embodiment of the self-routing switch of the present invention.

While in all the embodiments described above the store/switch elements in each switching stage are cyclically cascade-connected, the self-routing switch of the present invention can be implemented even without such cyclic-connection of the elements. FIG. 26 shows, corresponding to FIG. 3, an example of such a self-routing switch.

In FIG. 26 the self-routing switch has n input lines $IN_1$ to $IN_n$ and n output lines $OUT_1$ to $OUT_n$ and comprises n switching stages $\mathbf{12}_a$ to $\mathbf{12}_m$. The switching stages $\mathbf{12}_1$ to $\mathbf{12}_m$ are respectively assigned m sub-bit strings $S_1$ to $S_m$ divided from k-bit routing information (where $2^{k-1}<n \leqq 2^k$), and they perform routing processing in accordance with the sub-bit strings. Now, a description will be given of the case where the header has been divided into m (where $m=k/t$, t being a positive integer) equal parts. All store/switch elements in each switching stage are merely cascade-connected, and an information data provided from the input link $X_{ji}$ is shifted, in one direction, through the cascade-connected elements by $S_i \cdot 2^{k-it}$ and is transferred to the next switching stage from the element to which the information data was finally shifted. In the self-routing switch depicted in FIG. 26, the first switching stage $\mathbf{12}_1$ has, in addition to n elements $E_{11}$ to $E_{n1}$ connected to the input lines $IN_1$ to $IN_n$, $2^{k-it}(2^t-1)$ cascade-connected elements. Accordingly, the number of output links of the first switching stage $\mathbf{12}_1$ is $n+2^{k-it}(2^t-1)$, namely, $n+2^k(1-2^{-t})$ since $i=1$. The number of elements increased in the first switching stage $\mathbf{12}_1$ is the maximum number of shift operations to which one information data can be subjected in the first switching stage $\mathbf{12}_1$. An ith switching stage $\mathbf{12}_i$ has cascade-connected elements of a number $v_i=n+2^k(1-2^{-it})$ which is equal to the sum of the number, $u_i=n+2^k(1-2^{-it+t})$, of output links from the preceding stage (i.e. the number of input links of the ith stage) and the maximum number, $2^{k-it}(2^t-1)$m of shift operations to which one information data can be subjected in the ith stage. The ith switching stage $12_i$ has output links of the same number as the cascade-connected elements. In the final mth switching stage $12_m$ first and (n+1)th output links $X_{1(i+1)}$ and $X_{(n+1)(i+1)}$ are connected together to an OR gate $32_1$, in which their outputs are ORed and from which the ORed output is provided to the output line $OUT_1$. The other output links are also connected in a similar way. That is, two output links $X_{j(i+1)}$ and $X_{(j+n)(i+1)}$ spaced n links apart are connected together to an output line $OUT_j$ via an OR gate. In this instance, one extra input of the nth OR gate $32_n$ is always supplied with "0". The reason for which the outputs of every nth output links of the final switching stage are ORed as mentioned above is that when the difference between the numbers of the input and output lines to be connected, (O)−(I), is smaller than O, the header is defined such that H=O−I+n based on the aforementioned definition, resulting in information data being provided at a position spaced n apart from its specified output link of the final switching stage. In other words, the embodiment depicted in FIG. 26 allows, by increasing the number of cascade-connected elements, further downward shift of the information block beyond the nth row each switching stage in the case where the number n is added according to the definition of the header. On the other hand, the embodiment in FIG. 3 implements the movement of the information data in the switch by the cyclic cascade-connection of the elements. However, both embodiments employ the same basic principle of operation.

In the embodiment of FIG. 3 the amount of hardware used is smaller than in the case of FIG. 26, but since the bottom element must be connected to the top one in the same switching stage, the line interconnecting them becomes longer with an increase in the number of cascade-connected elements and the operating speed of the switch is limited by the line length. On the other hand, the embodiment of FIG. 26 does not call for the above wiring for the cyclic connection, and hence is able to operate at a higher speed. Furthermore, the arrangement and connection of the elements are suitable for fabrication of the switch as an LSI.

Also in the embodiment shown in FIG. 26, the broadcast connection can be achieved by constituting each element $E_{ji}$ as depicted in FIG. 11 and the routing operation for a variable-length information block can be performed by constituting each element $E_{ji}$ as shown in FIG. 12.

It will be apparent that many modifications and variations may be effected without departing from the novel concepts of the present invention.

What is claimed is:

1. A self-routing switch which includes at least one switching stage having a plurality of input links and a plurality of output links and is connected to n input lines, where n is equal to or greater than 1, and in which said at least one switching stage includes a plurality of store/switch elements which are connected to said input and output links respectively corresponding thereto and are sequentially cascade-connected from the top to the bottom of said switching stage through internal links;

each of said store/switch element comprising;

latch means for temporarily storing an information data;

link selector means for supplying said stored information data selectively to said output link corresponding to said store/switch element and said internal link connected to the next lower one of said cascade-connected store/switch elements; and selector control means for controlling the selection of said link selector means in accordance with routing information contained in said stored information data;

each of said input links, each of said output links, and each of said internal links being respectively composed of parallel bit lines of the same number p, where p is equal to or greater than 2; said latch means of each said store/switch element including p data latches respectively connected to the corresponding p parallel bit lines of said input link; said link selector means of each said store/switch element including p link selectors respectively connected to the corresponding p parallel bit lines of said output link and the corresponding p parallel bit lines of said internal link connected to the p data latches of the next lower one of said cascade-connected store/switch elements;

a routing operation for said information data being performed in synchronism with a system clock.

2. The self-routing switch of claim 1, wherein a plurality of said switching stages are provided and are cascade-connected by connecting said output links of each said switching stage and corresponding ones of said input links of succeeding one of said switching stages, respectively.

3. The self-routing switch of claim 1, wherein p≧n.

4. The self-routing switch of claim 1, wherein said selector control means of each said store/switch element in each said switching stage has routing information storage means connected to at least one of the p parallel bit lines of said input link related to said element, said at least one of the p parallel bit lines corresponding to said switching stage.

5. The self-routing switch of claim 4, wherein said routing information storage means can hold a portion of said routing information which corresponds to said switching stage, for a period of time corresponding to at least n shots of said system clock.

6. The self-routing switch of claim 5, wherein p≧n said routing information storage means includes at least one shift register composed of p cyclically cascade-connected flip-flops; and that portion of said routing information corresponding to said switching state is input into one of said p flip-flops of said shift register from said at least one of the l parallel bit lines of said input link, shifted in said shift register in synchronism with said system clock and circulated in said shift register by a predetermined number of times, and by the output of said one of said p flip-flops, said p link selectors corresponding thereto are controlled.

7. The self-routing switch of a claim 1, wherein each said input link of a first one of said plurality of switching stages has connected thereto a serial-parallel converter by which said information data input thereto is converted into parallel form every p-digit word.

8. The self-routing switch of claim 1 wherein said selector control means of each said store/switch element includes broadcast connection bit storage means connected to a predetermined one of the p parallel bit lines of said input link related to said store/switch element and receives and stores in said broadcast connection bit storage means a broadcast connection bit contained in said routing information; and said selector control means controls said p link selectors in accordance with the logical value of said stored broadcast connection bit, regardless of the other routing information, so that the outputs of said p data latches may be supplied to both the parallel bit lines of said output link and to the p parallel bit lines of said internal link connected to the next lower one of said cascade-connected store/switch elements.

9. The self-routing switch of claim 8, wherein said broadcast connection bit storage means can hold said broadcast connection bit for a period of time corresponding to at least n shots of said system clock.

10. The self-routing switch of claim 9, wherein p≧n; said broadcast connection bit storage means includes a shift register composed of p cyclically cascade-connected flip-flops, for latching said broadcast connection bit into one of said p flip-flops from said one bit line of said input link, and for shifting said broadcast connection bit through said p flip-flops in synchronism with said system clock to circulate said broadcast connection bit in said shift register buy a number of times, the output of said one of said p flip-flops controlling said p link selectors corresponding thereto.

11. The self-routing switch of claim 1, 2, 4, 7, or 8, wherein each of said plurality of input links of the first one of said switching stages has connected thereto header inserting means which generates routing information containing a binary value given by modulus n of the difference between the input line number I of said input line related to said header inserting means and the output line number O of the output line on which an information data input from said input line is to be provided, said routing information being appended to said information data.

12. The self-routing switch of claim 11, wherein each of said output links of a final one of said switching stages has connected thereto header eliminating means for eliminating said routing information contained in said information data output from each said output link before said information data is supplied to the output line corresponding to said output link.

13. The self-routing switch of claim 1, 2, 4, 7, or 8, wherein buffer means is connected to each of said output links of a final one of said switching stages, said buffer means being capable of storing and holding plural information data to be output to the output line related thereto and outputting a series of said information data at fixed intervals.

14. The self-routing switch of claim 13, wherein the output of each said buffer means has connected thereto a parallel-serial converter, by which said information data of parallel p bits, output from said buffer means at fixed intervals, is converted to serial form for output onto said output line corresponding thereto.

15. The self-routing switch of claim 1, 2, 4, 7, or 8, wherein top and bottom ones of said plurality of cascade-connected store/switch elements are interconnected to form a cyclic cascade-connection.

16. The self-routing switch of claim 2, wherein a plurality k (where k≧2) of said switching stages are provided, each of said switching stages including a plurality n (where $2^{k-1}<n\leqq 2^k$) of said store/switch elements and said store/switch elements being cyclically cascade-connected; and said information data containing routing information of at least k bits is applied to one of said n input links of the first one of said switching stages from related one of said n input lines.

17. The self-routing switch of claim 16, wherein said information data is applied to each of said input links every parallel p-digit word of said information linked at a period of a larger one of p and n shots of said system clock.

18. The self-routing switch of claim 17 wherein said selector control means of each of said store/switch elements in said each switching stage has routing information storage means connected to one of the p parallel bit lines, which is corresponding to said switching stage, or said input link related to said element, said routing information storage means receiving and storing one routing information bit of said k-bit routing information which is assigned to said switching stage; and said selector control means controls said p link selectors corresponding thereto in accordance with the logical value of said stored routing information bit so that the p-digit word of said information data latched in said p data latches corresponding thereto is applied to either one of said output link and said internal link connected to the p data latches of the next lower one of said cascade-connected store/switch elements.

19. The self-routing switch of claim 18, wherein p≧n; said routing information storage means includes holding means for holding said one routing information bit in a first p-digit word of said information data during the generation of l×n (where l is an integer equal to or greater than 1) shots of said system clocks; and said selector control means controls said p link selectors corresponding thereto in accordance with said one routing information bit at every p system clocks.

20. The self-routing switch of claim 19, wherein said holding means includes a shift register composed of p cyclically cascade-connected flip-flops, for latching said assigned one routing information bit into one of said p flip-flops from said one of p parallel bit lines of said input link, and shifting said one routing information bit through said shift register in synchronism with said system clock to circulate said one routing information bit in said shift register by a predetermined number of times, the output of said one flip-flop controlling said p link selectors corresponding thereto.

21. The self-routing switch of claim 17, wherein each of said input links of said first switching stage has connected thereto a serial-parallel converter whereby an information data input to said input link is converted to parallel form every p-digit word.

22. The self-routing switch of claim 17 where said selector control means of each of said store/switch elements includes broadcast connection bit storage means connected to a predetermined one of the p parallel bit lines of said input link related to said element and receives and stores in said broadcast connection bit storage means a broadcast connection bit contained in said routing information; and said link selector means controls said p link selectors in accordance with said stored broadcast connection bit, regardless of said k-bit routing information, so that the outputs of said p data latches may be supplied to both the p parallel bit lines of said output link corresponding thereto and to the p parallel bit lines of said internal link connected to the p data latches of the next lower one of said cascade-connected store/switch elements.

23. The self-routing switch of claim 22, wherein p≧n and said broadcast connection bit storage means includes means for holding said broadcast connection bit during the generation of l×p shots of said system clocks where l is an integer equal to or greater than 1.

24. The self-routing switch of claim 23, wherein said holding means includes a shift register composed of p cyclically cascade-connected flip-flops, for latching said broadcast connection bit into one of said p flip-flops from said one of p parallel bit lines of said input link, and shifting said broadcast connection bit through said shift register in synchronism with said system clock to circulate it in said shift register by a predetermined number of times, the output of said one flip-flop controlling said p link selectors corresponding thereto.

25. The self-routing switch of claim 16, wherein n header inserting means are provided respectively between said n input links of said first switching stage and said n input lines,each of said header inserting mean obtaining the value of (O−I) mod n, as a k-bit value expressed in binary, on the bases of the number I of the input line related to said header inserting means and the number O of the output line to which said information data input from said input line is to be transferred, routing information containing said k-bit binary-expressed value being inserted into said input information data.

26. The self-routing switch of claim 25, wherein each of said output links of a final one of said switching stages has connected thereto header eliminating means for eliminating said routing information contained in said information data output from each said output link before said information data is supplied to the output line corresponding to said output link.

27. The self-routing switch of claim 18, 21, or 22, wherein n buffer means are connected to said n output links of a final one of said k switching stages, for storing and holding a series of said parallel p-digit words to be provided on said output line corresponding to said output link and providing them on said output line at intervals of said system clocks of a larger number of p and n.

28. The self-routing switch of claim 16, wherein said selector control means of each said store/switch element includes p selector controllers provided respectively corresponding to said p link selectors; said p selector controllers each include a header bit latch; said p selector controllers are controlled by the outputs of said header bit latches corresponding thereto; said p header bit latches are cyclically cascade-connected to constitute a p-bit circulating shift register which is driven by said system clock; one of said selector controllers in each said store/switch element of an ith (where i=1, 2, . . . k) one of said switching stages which corresponds to an ith bit line of said input link includes header bit input means for inputting a header it into said header bit latch of said selector controller from said ith bit line; and said each input link of said first switching stage is provided with serial-parallel converting means whereby said information data thereto is converted to parallel form every p-digit word and said converted parallel p bits are provided on the p parallel bit lines of said input link while being sequentially delayed by one system clock.

29. The self-routing switch of claim 28 wherein each of said p selector controllers of each said store/switch element includes a broadcast connection bit latch; said p broadcast connection bit latches are cyclically cascade-connected to constitute a second p-bit circulating shift register which is driven by said system clock; one of said selector controllers in each said store/switch element of each said switching stage which corresponds to a predetermined Ith bit line of said input link other than those corresponding to said k-bit routing information includes means for inputting a broadcast connection bit into said broadcast connection bit latch of said selector controller from said Ith bit line; and said p selector controllers control said p link selectors related thereto in accordance with the outputs of said p broadcast connection bit latches, regardless of the outputs of said p header bit latches, so that the outputs of said p data latches may be supplied to both the p parallel bit lines of said output link corresponding thereto and to the p parallel bit lines of said internal link connected to the p data latches of the next lower one of said cascade-connected store/switch elements.

30. The self-routing switch of claim 28 or 29, wherein each of the p parallel bit lines of each said output link of said kth switching stage is connected to phase compensating means which receives a string of output bits therefrom and outputs them every p system clocks after compensating their phases.

31. The self-routing switch of claim 28 or 29, wherein each said store/switch element is provided with header eliminating means for eliminating the corresponding header bit contained in said information data.

32. The self-routing switch of claim 28 or 29, wherein each said output link of said final switching stage is provided with parallel-serial converting means whereby each said p-digit word of p parallel bits sequentially output while being shifted by one system clock is converted to a serial p-digit word.

33. The self-routing switch of claim 30, wherein parallel-serial converting means is provided at the output side of said phase compensating means, for converting to a serial p-digit word each said n-digit word of p parallel bits output from said phase compensating means while being sequentially shifted by one system clock.

34. The self-routing switch of claim 1, wherein a plurality m (where $m \geqq 1$) of said switching stages are provided; and an ith (where $1 \leqq i \leqq m$) has a number $u_i = n + 2^k(1 - 2^{-it+t})$ of said input links, a number $v_i = n + 2^k(1 - 2^{-it})$ of said output links, and the number $v_i$ of said cascade-connected store/switch elements, where $2^{k-1} < n \leqq 2^k$, $m = k/t$, k and t being integers equal to or greater than 1.

35. The self-routing switch of claim 34, wherein each pair of said output links of an mth switching stage, spaced n apart, are connected to ORing means provided corresponding thereto.

36. The self-routing switch of claim 34 or 35, wherein each said store/switch element has broadcast connection control means whereby said link selector means in said store/switch element is controlled so that said information data input into said element is supplied to both of said output link and input link corresponding to said element in accordance with the value of a specified bit of said routing information.

37. The self-routing switch of claim 34 or 35, wherein each said store/switch element of said ith switching stage has means for storing a portion of said routing information corresponding to said ith switching stage.

* * * * *